(12) United States Patent
Kuiper et al.

(10) Patent No.: US 7,815,040 B2
(45) Date of Patent: Oct. 19, 2010

(54) IMPACT BED ASSEMBLY FOR CONVEYOR BELTS

(75) Inventors: Daniel J. Kuiper, Alto, MI (US); Brett E. DeVries, Comstock Park, MI (US); Richard W. Gilman, Sparta, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 12/479,421

(22) Filed: Jun. 5, 2009

(65) Prior Publication Data

US 2009/0294257 A1  Dec. 3, 2009

Related U.S. Application Data

(63) Continuation of application No. PCT/US2008/088489, filed on Dec. 29, 2008, and a continuation of application No. 12/345,610, filed on Dec. 29, 2008.

(60) Provisional application No. 61/017,473, filed on Dec. 28, 2007.

(51) Int. Cl.
*B65G 15/08* (2006.01)
(52) U.S. Cl. ...................... 198/823; 198/841
(58) Field of Classification Search ................. 198/823, 198/825, 828, 837, 841
See application file for complete search history.

(56) References Cited

U.S. PATENT DOCUMENTS

| | | | |
|---|---|---|---|
| 2,974,777 A | 3/1961 | Marsh | |
| 4,793,470 A | 12/1988 | Andersson | |
| 4,932,516 A * | 6/1990 | Andersson | 198/823 |
| 5,007,528 A | 4/1991 | Hideharu | |
| 5,038,924 A | 8/1991 | Stoll | |
| 5,103,967 A | 4/1992 | Stoll | |
| 5,131,530 A | 7/1992 | Rappen | |
| 5,350,053 A | 9/1994 | Archer | |
| 5,368,154 A | 11/1994 | Campbell | |
| 5,799,780 A | 9/1998 | Steeb, Jr. et al. | |
| 5,813,513 A | 9/1998 | Taube | |
| 5,988,360 A | 11/1999 | Mott | |
| 6,454,083 B2 | 9/2002 | Burkhart et al. | |
| 6,913,138 B2 | 7/2005 | Wiggins | |
| 7,527,144 B2 * | 5/2009 | Ostman | 198/823 |
| 2004/0079621 A1 | 4/2004 | Mott | |

OTHER PUBLICATIONS

PCT International Search Report dated Feb. 24, 2009, to PCT Application No. PCT/US2008/088489.
Web for Arch Environmental Equipment, Inc. dated Aug. 30, 2007, "Simplicity Impact System," www.archenv.com/Conveyor/Impact%5FSystem/.
Brochure for Argonics, Inc., "Load Zone: Conveyor Belt Support Systems".

(Continued)

*Primary Examiner*—James R Bidwell
(74) *Attorney, Agent, or Firm*—Fitch, Even, Tabin & Flannery

(57) ABSTRACT

Impact bed assemblies are provided, both static and dynamic, for absorbing impact forces taken by conveyor belts. The static and dynamic bed assemblies generally are constructed to optimize their impact absorption capacities while minimizing their space requirements under the belt.

50 Claims, 18 Drawing Sheets

OTHER PUBLICATIONS

Brochure for ASGCO Manufacturing Co., Inc., "Load Zone Support Systems," 2005.
Website for Classic Conveyor Components dated Aug. 30, 2007, "Classic Heavy Duty and Medium Duty Slider Beds—Product Overview," www.classicconveyor.com/slider_beds.html.
Website for Classic Conveyor Components dated Aug. 30, 2007, "Classic Heavy Duty Impact Cradles Fixed Model—Product Overview," www.classicconveyor.com/impact_cradles_hdfix.html.
Website for CME dated Aug. 30, 2007, "CME Dynamic Impact Tables," www.crushingandmining.com.au/cme_impact_tables.asp.
Website for CME dated Aug. 30, 2007, "ROSTA Damping and Oscillating Technology," www.crushingandmining.com.au/cme_rosta.asp.
Brochure for CME, "The CME Dynamic Impact Table using ROSTA ESL Mounts."
Brochure for Douglas Manufacturing Co., Inc.'s Impact Beds dated Jun. 8, 2005.
Website for Douglas Manufacturing Co., Inc. dated Aug. 30, 2007, "Material Control Products—Titan Floater Sectional Impact Bed Assembly," www.douglasmanufacturing.com/material-cont-products/titanFloater.php3.
Website for Douglas Manufacturing Co., Inc. dated Aug. 30, 2007, "Material Control Products—Titan CEMA C & D Impact Bed Assemblies 48" & 60"," www.douglasmanufacturing.com/material-cont-products/titanCEMA.php3.
Website for Douglas Manufacturing Co., Inc. dated Aug. 30, 2007, "Material Control Products—Titan Trailblazer Sectional Impact Bed Assembies," www.douglasmanufacturing.com/material-cont-products/titanTrailblazer48.php3.
Website for Douglas Manufacturing Co., Inc. dated Aug. 30, 2007, "Material Control Products—Titan CEMA C & D Impact Bed Assemblies 48" & 60"," www.douglasmanufacturing.com/material-cont-products/titanTrailblazer60.php3.
Website for Douglas Manufacturing Co., Inc. dated Aug. 30, 2007, "Material Control Products," www.douglasmanufacturing.com/material-cont-products/index.php3.
Website for Horizon Conveyors dated Aug. 30, 2007, "Horizon Skirt Systems Impact Bars," www.horizon-conveyors.co.uk/impactbedsbars.htm.
Website for Jim Way dated Dec. 4, 2007, "Product Introduction> Transfer Loading > Impact Bed," www.roller.com.tw/style/content/CN-07-2a/roduct.asp?lang+2&customer_id+1603....
Brochure for Kinder and Co. Pty. Ltd., "K-Impact Belt Support System."
Brochure for Leverlink Australia Pty Ltd, "Specialists in Conveyor Impact & Load Zone Design," dated Jan. 18, 2003.
Website for Leverlink Australia Pty Ltd. dated Aug. 30, 2007, "Leverlink Dynamic Impact Beds," www.leverlink.com.au/dynamicImpactBeds/.
Website for Martin Engineering dated Aug. 30, 2007, "Martin Guardabelt Light-Duty Impact Cradle," www.martin-eng.com/products.php?product=59&print_view=1.
Website for Martin Engineering dated Aug. 30, 2007, "Martin Guardabelt Medium-Duty Impact Cradle," www.martin-eng.com/products.php?product=110&print_view=1.
Website for Martin Engineering dated Aug. 30, 2007, "Martin Trac-Mount Impact Cradle," www.martin-eng.com/products.php-?product=138&print_view=1.
Website for Martin Engineering dated Aug. 30, 2007, "Martin Guardabelt Heavy-Duty Impact Cradle," www.martin-eng.com/products.php?product=137&print_view=1.
Martin Engineering, "Martin Heavy-Duty Guardabelt Impact Cradle Operator Manual," dated Dec. 2002.
Brochure No: 1077-11-01-WPC/Trelleborg-English for Metso Minerals, "Trellex Loading Station," dated 2003.
Website for Stephens-Adamson, "Impact System".
Brochure for Tega Industries Ltd., "Dynamic Impact Pads."

* cited by examiner

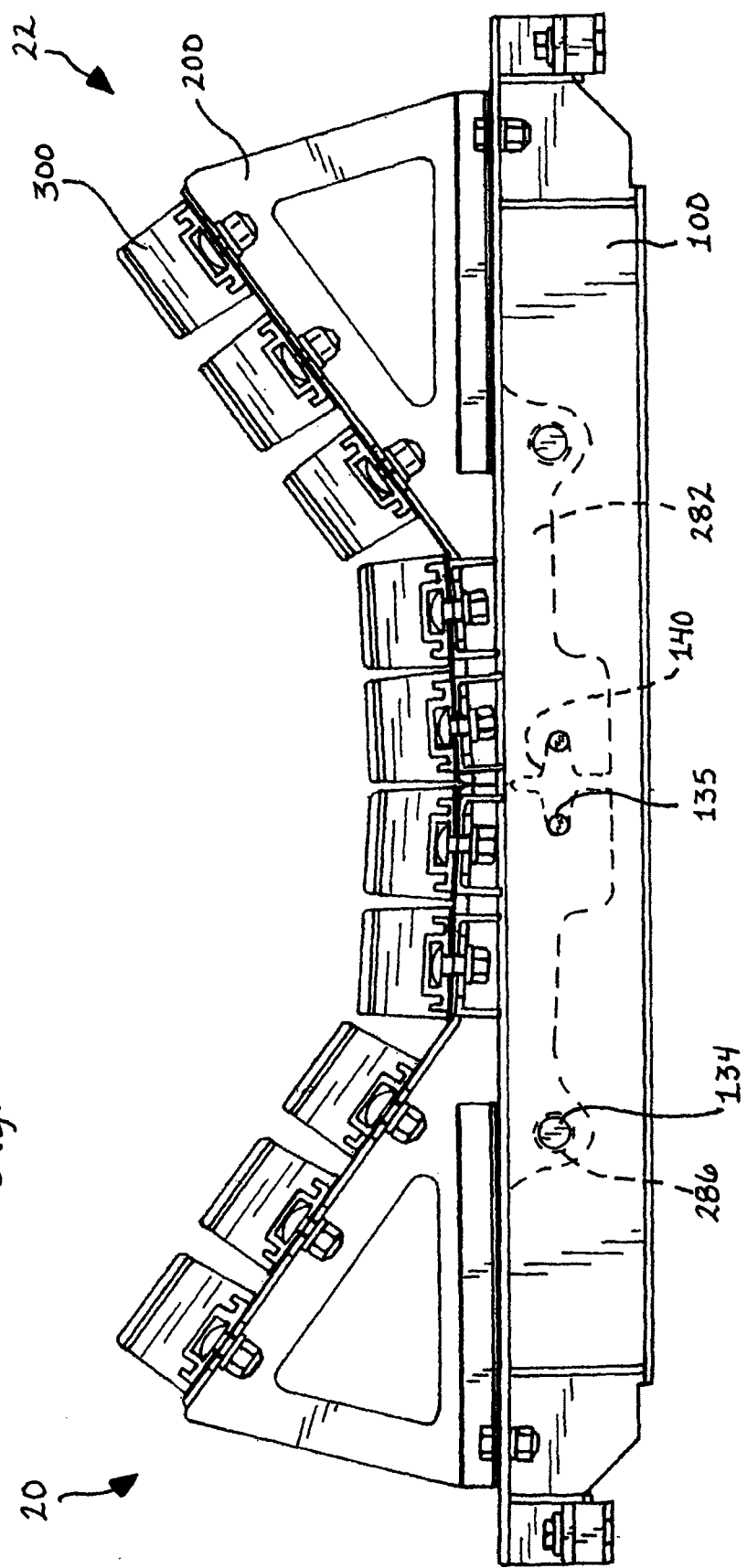

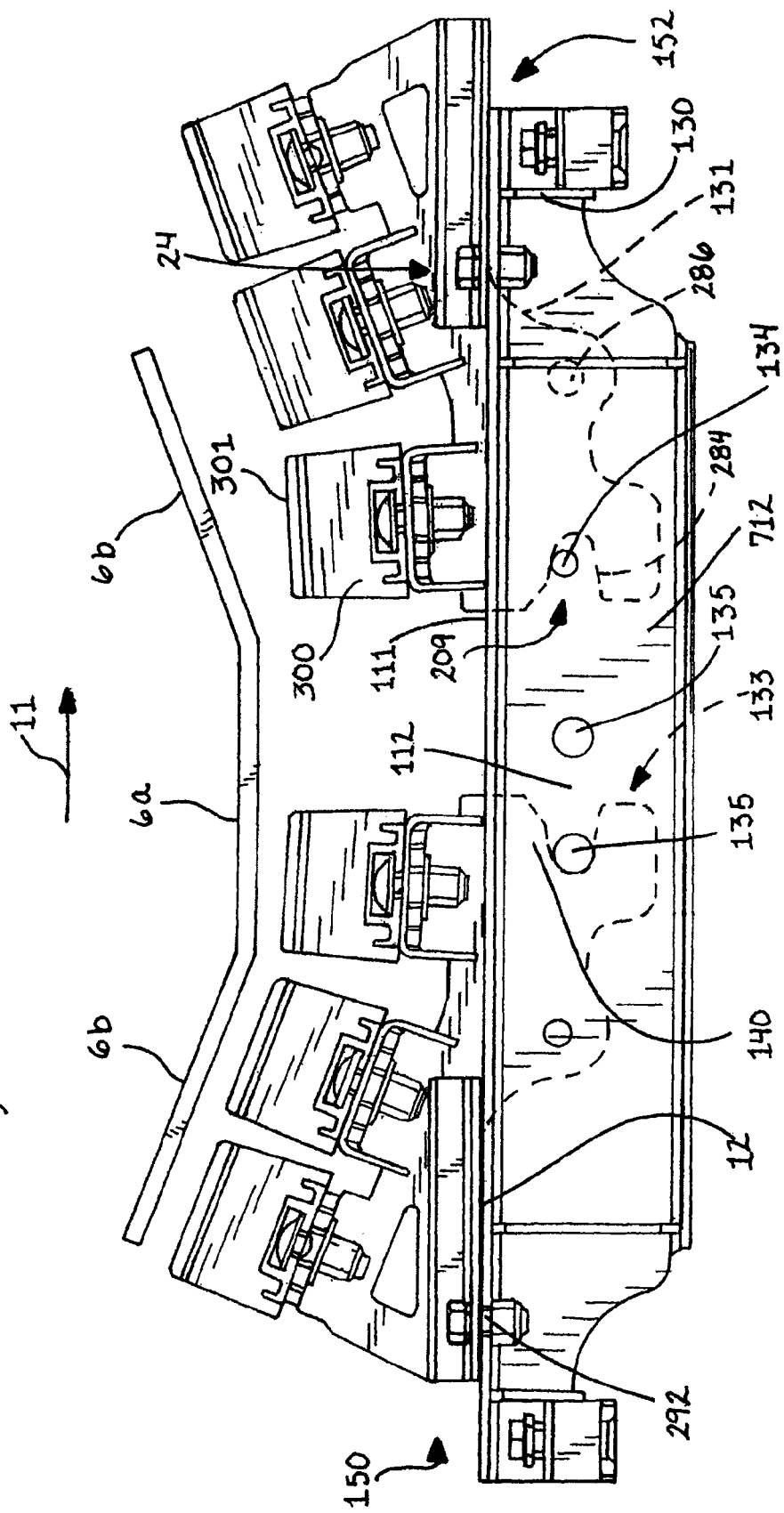

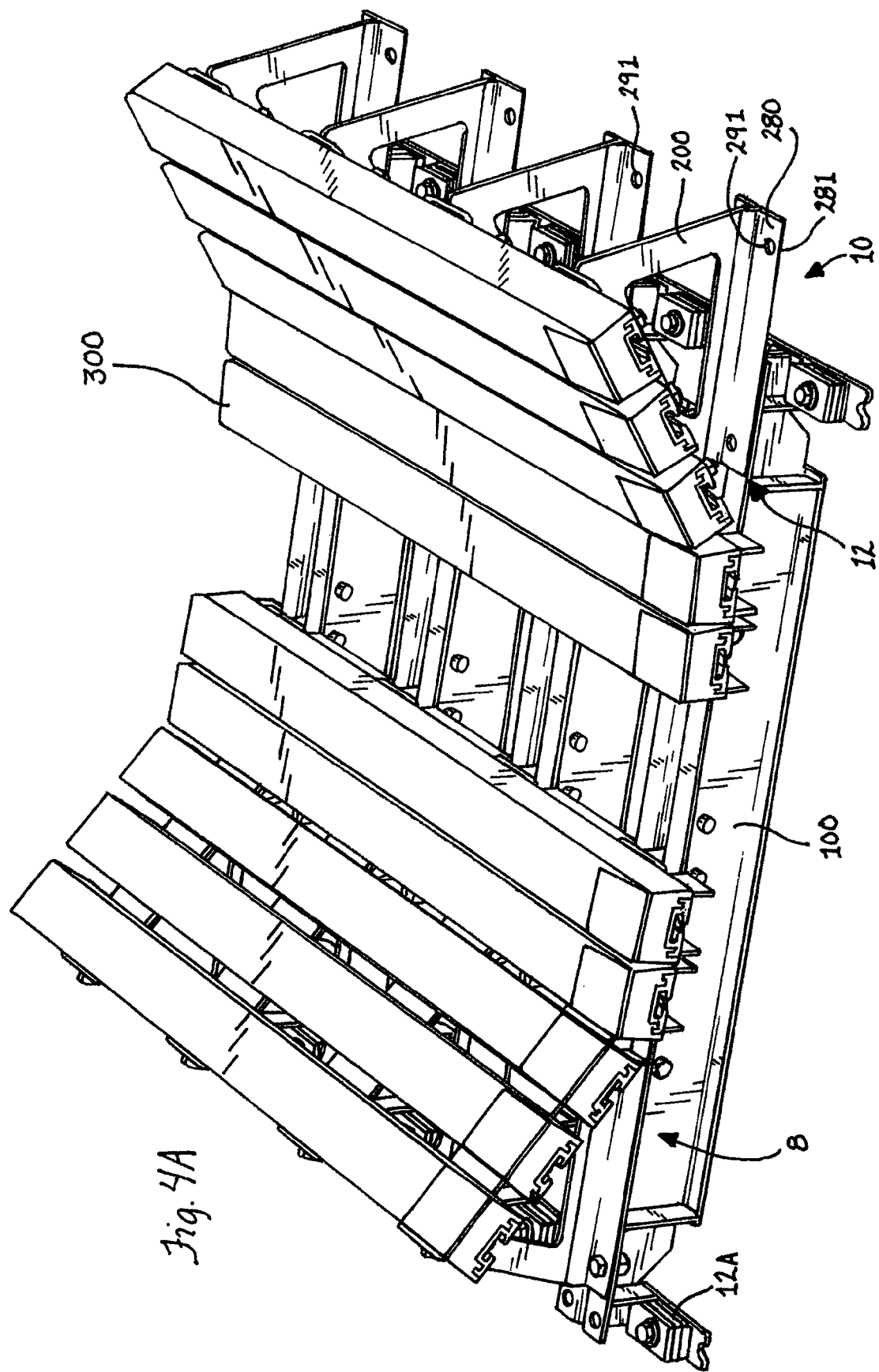

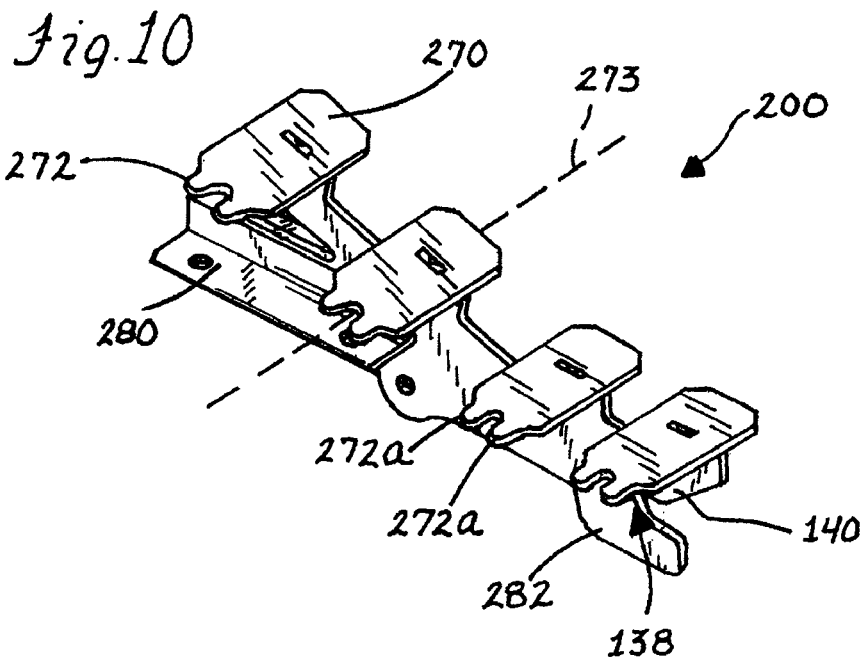
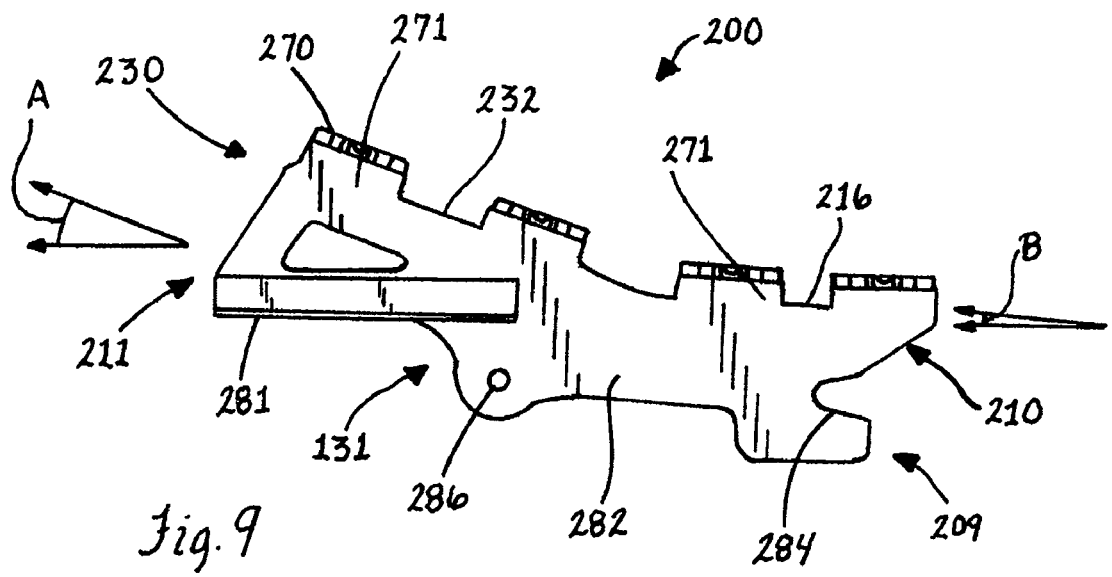

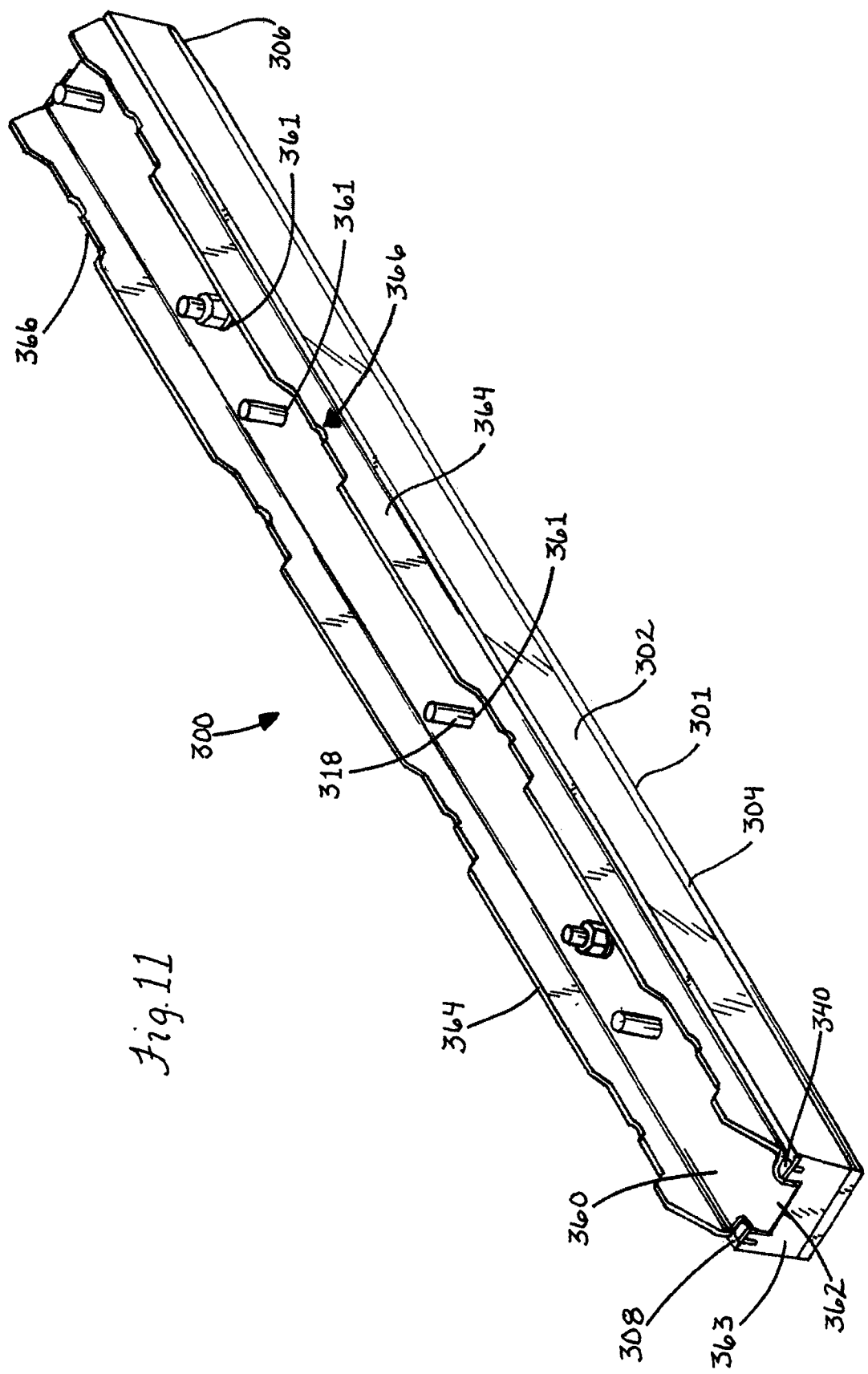

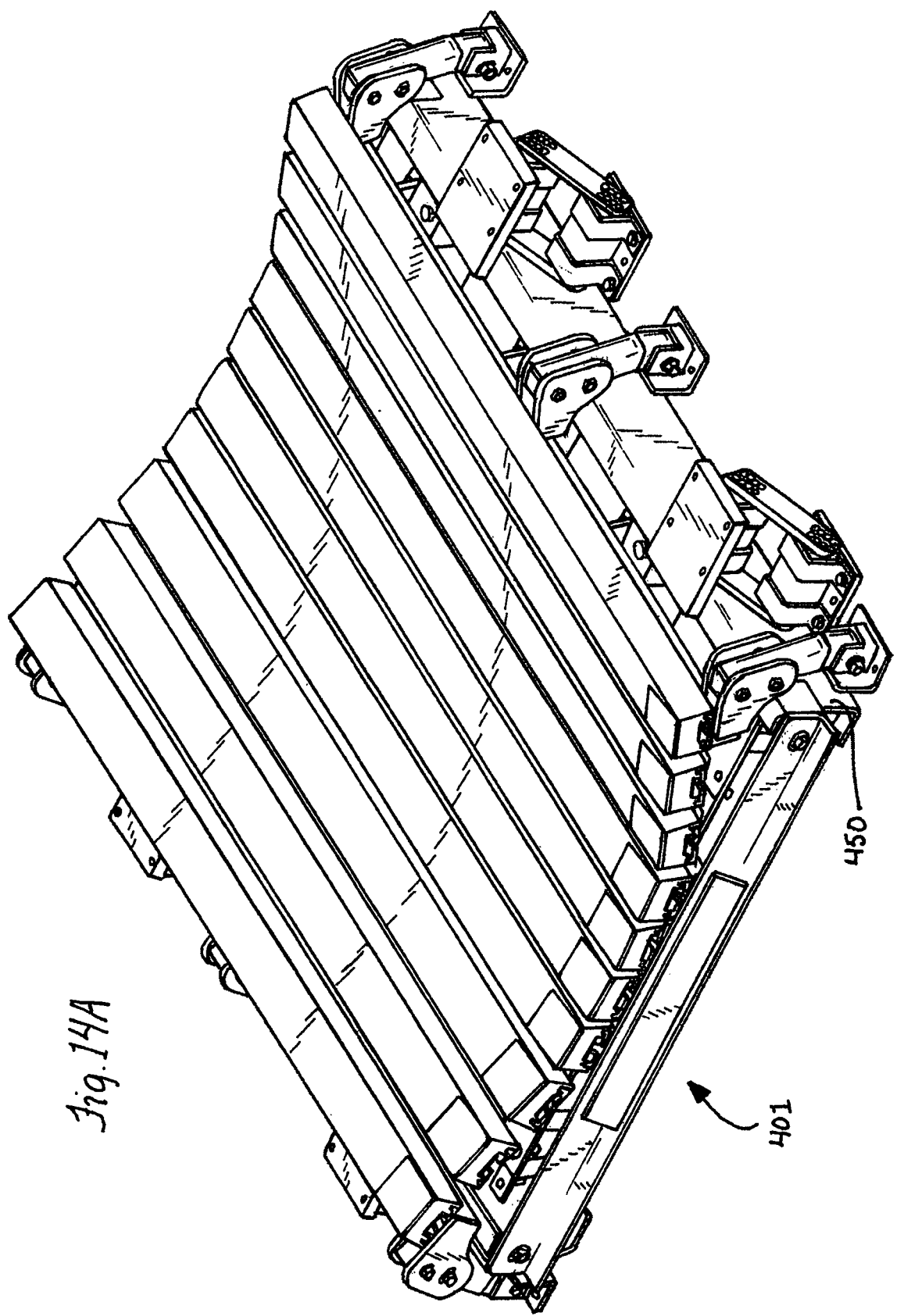

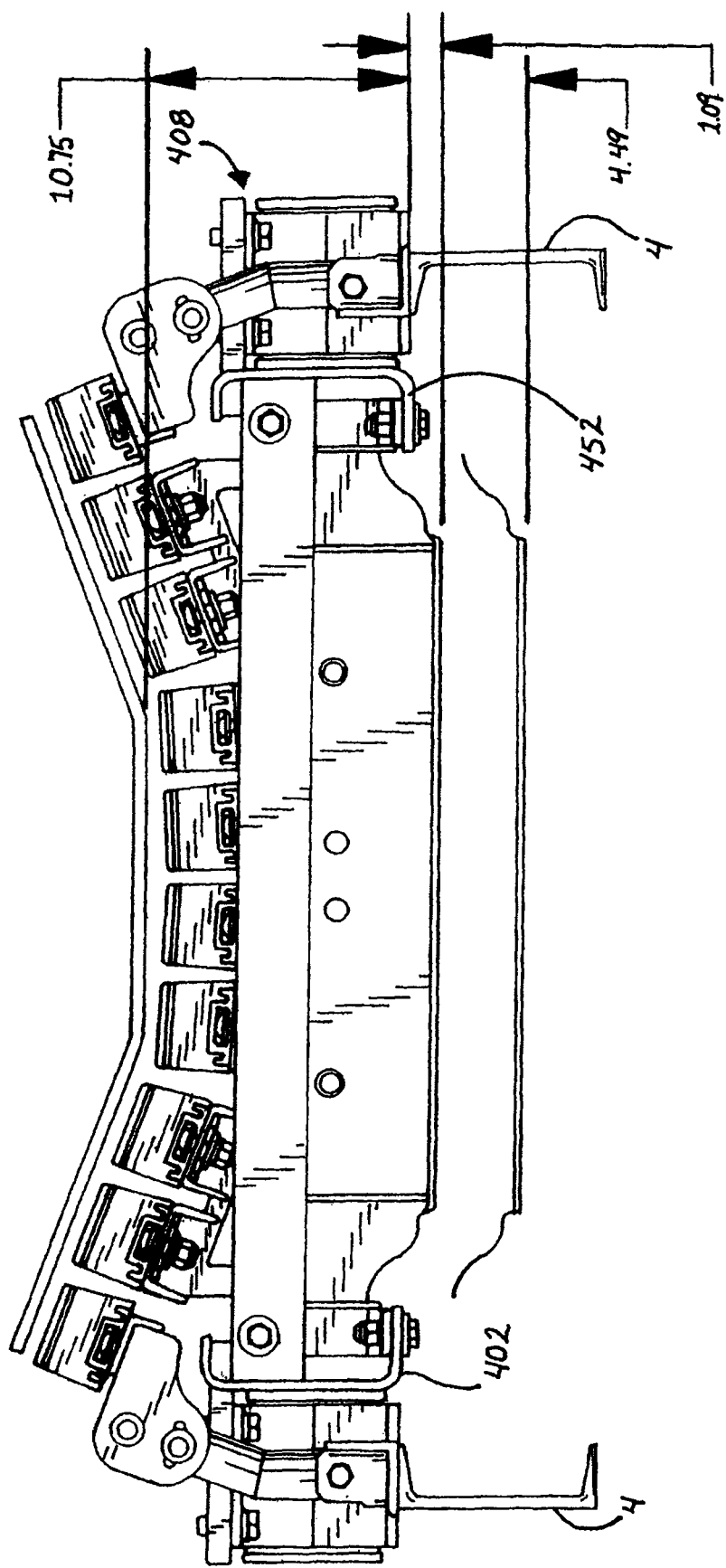

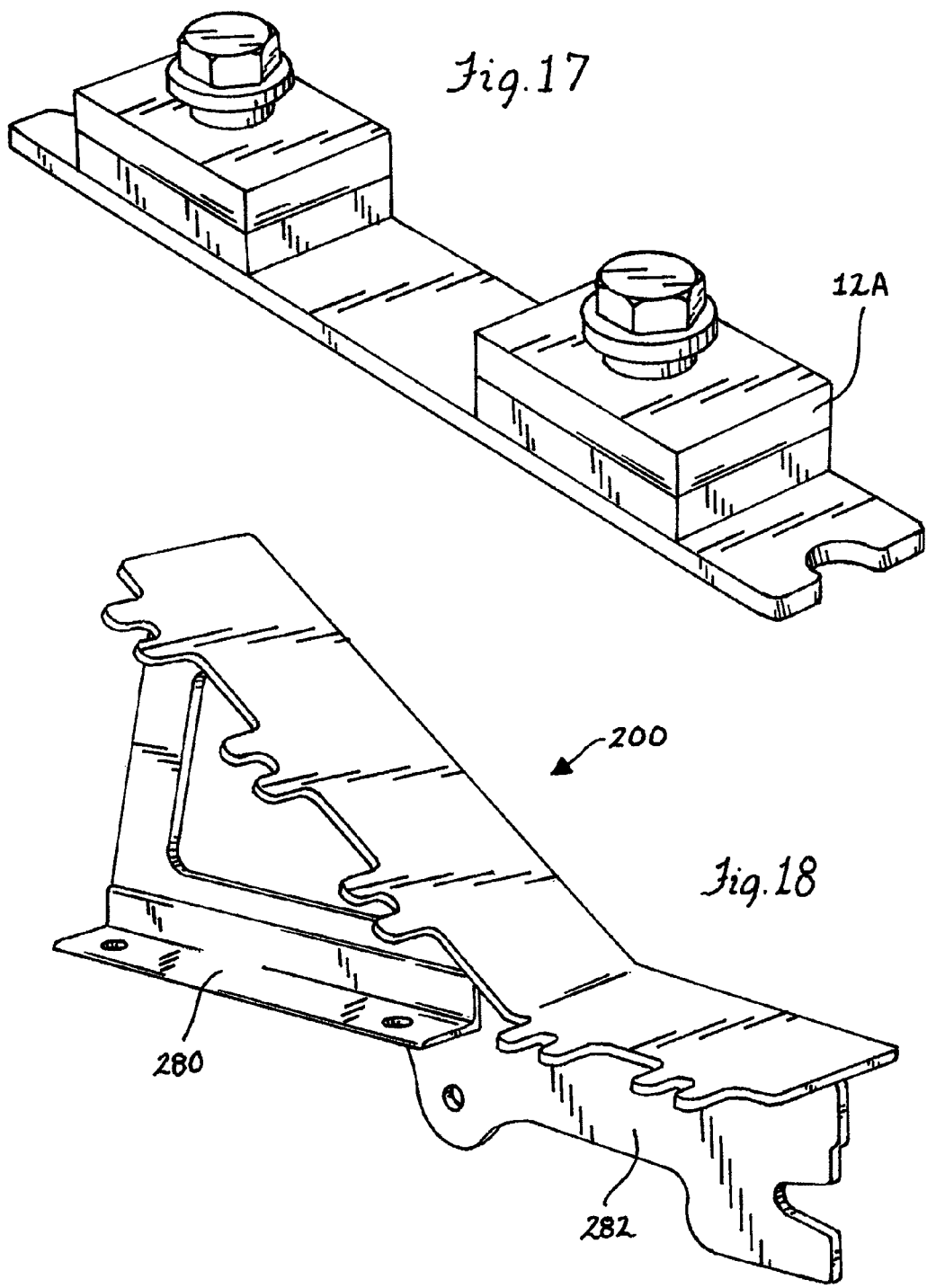

ns an impact bed that provides easier servicing of impact bars

IMPACT BED ASSEMBLY FOR CONVEYOR BELTS

CROSS REFERENCE TO RELATED APPLICATIONS

This application is a continuation of PCT Application No. PCT/US2008/088489, filed Dec. 29, 2008, and U.S. patent application Ser. No. 12/345,610, filed Dec. 29, 2008, both of which claim priority to U.S. Provisional Patent Application No. 61/017,473, filed Dec. 28, 2007, all of which are incorporated herein by reference in their entirety.

FIELD OF THE INVENTION

The invention relates to an impact bed for a conveyor belt and, more particularly, to impact bed assemblies that are conventionally known as static and dynamic-type impact beds.

BACKGROUND OF THE INVENTION

Conveyor belts are used in a variety of industries to transport goods and materials from one place to another. Generally, goods are deposited at one end of a conveyor and are transported to the other end, where they are discharged or otherwise removed from the conveyor belt. The belts used are often robust, but are susceptible to damage from a variety of sources. While the discharge of the goods from a conveyor belt does not usually cause damage to the belt, the act of depositing goods and materials onto a conveyor belt has the potential to cause damage. In this regard, when a belt is being used to transport coal, aggregate and other coarse and heavy material, the deposit of these types of rocks onto the belt can generate tremendous impact forces on the belt. For instance, with a 100 lb mass having drop distance of 10 feet from a discharge chute onto a conveyor belt, there is 1,000 ft-pounds of force impacting the belt.

An impact bed is an apparatus which is installed below the area of a conveyor belt on which heavy loads are deposited for absorbing the impact forces generated thereby, as discussed above. Generally, impact beds can be classified as either static or dynamic. Static impact beds have resilient impact bars and an underlying bed framework that includes rigidly connected frame members. For instance, static impact beds typically include at least two support members for supporting the resilient impact bars thereon with the support members extending from either side of the belt inwardly and toward the middle of the belt. The support members are rigidly secured on cross members that span the width of the belt to be rigidly secured to stringers of the conveyor belt frame.

By contrast, dynamic impact beds differ from static impact beds in the manner in which impact forces are absorbed since, rather than using resilient impact bars, dynamic impact beds have torsion bias units mounted under an impact cradle upon which the belt is supported. In this regard, unlike static beds, the bed framework underlying the impact cradles includes frame members resiliently connected together via the torsion bias units secured therebetween.

Generally, there is a trade off between increasing the capacity of the bed to absorb impact forces, such as by using thicker impact bars with static impact beds, and the size of the impact bed. In other words, an impact bed having a compact size for fitting under the belt generally sacrifices in its ability to absorb high impact forces. Given that an impact bed is meant to be installed under the upper or carry run of a belt, a location often without an excess of space, balancing the size and strength of the bed is important. Generally, the vertical height between the carry run of the belt and the upper surface of the conveyor frame stringer member currently is approximately 8.5 to approximately 9.0 inches and cost constraints may tend to shrink the size of this space even further.

In typical static impact beds, several sets of support members will be longitudinally spaced from each other under the area of the belt where materials are deposited thereon for being conveyed thereby. The longitudinally spaced support members have the resilient bars secured thereto to extend thereacross running lengthwise in the belt travel direction and which are operable to absorb the impact forces and to decrease the acceleration of the materials or rocks dropped onto the belt. The resilient bars are subject to wear and damage over repeated impacts with the belt and thus need to be serviced and/or replaced on a regular basis.

In many static impact beds, servicing of the impact bars, particularly for those in the lower central area under a troughed belt, requires that the loading on the impact bed by the heavy conveyor belt thereon be relieved. This allows an operator to unfasten the support members from the cross members so that the support members and impact bars thereon can be removed out from under the belt for servicing.

In some prior static impact beds, the support members upon which the impact bars are secured can be slid in and out from under the conveyor belt along the cross members. However, when the support members are slid out from under the conveyor belt, the relatively heavy support members and impact bars thereon, e.g. approximately 100 to 200 lbs., must be supported, such as by heavy equipment like a crane or other lifting or support mechanism, which allows an operator to safely replace the impact bars.

In prior static impact beds, the support members are secured in their operative positions under the belt by being bolted to the cross members. This requires that an operator reach or climb under the belt to access the bolt locations, which can be of particular difficulty when the bolting needs to occur centrally under a troughed belt at which the belt is at its lowest height and where there is very little work space available between the upper and lower runs of the belt. Similar problems are presented when servicing of the impact bed is necessary and the securing bolts need to be removed.

Thus, prior static impact beds suffer from problems with optimizing size of the bed and their impact absorption capacity, and from difficulty in servicing the resilient impact bars.

Known dynamic impact beds differ from static beds by the provision of torsion bias units, such as Rosta mounts, between the cross members and the upper impact cradles of the beds. In one known dynamic impact bed, the Rosta mounts are secured on elevated platforms extending up from the cross member and connected to outer ends of the support members thereover. In another known dynamic impact bed, a pair of Rosta mounts are linked together, with the lower unit secured to the cross member and the upper unit secured to the impact cradle. In both instances, the profile of the dynamic impact bed above the cross members is undesirably increased due to the location of the Rosta mounts under the belt and over the cross members. In this regard, the impact cradles typically need to have a very low profile and thus utilize low profile impact plates that engage under the belt instead of the thicker, resilient impact bars used with static impact beds.

SUMMARY OF THE INVENTION

In accordance with one aspect of the invention, an impact bed assembly is provided that provides simpler and easier replacement of impact bars connected to the support members of the impact bed assembly. In this regard, the impact bed assembly has a slide interface between a cross member and a support member for allowing the support member, with impact bars mounted thereon, to translate along the cross member from an operative position under the belt to a predetermined service position on the cross member at which the impact bars can readily be serviced. In the predetermined service position, the support member and impact bars thereon are still securely supported on the cross member thus allowing an operator to replace the impact bars by only sliding the support member out from under the belt to the predetermined service position. In this manner, the securely supported support member on the cross member when in the service position permits safe and easy changing of the impact bars without the need for employing heavy equipment to support or lift the support member for servicing of the impact bars thereon. Accordingly, the slide interface and predetermined service position provided for the present impact bed assembly allows for easier and faster servicing of the impact bars in terms of shifting of the support member in a direction out from under the belt, replacement of the impact bars connected thereto, and shifting of the support member back to its operative position.

Preferably, there are multiple support members that are spaced in the longitudinal, belt travel direction and which have the impact bars extending transversely thereacross and rigidly secured thereon to form one of two identical side impact bed subassemblies that are slid on corresponding cross members from either side of the belt. The support members and impact bars are configured to remain securely upright on the cross members when in the predetermined service position. In particular, when in the predetermined service position the center of mass of the combined mass of the interconnected support members and impact bars is located vertically above the cross members laterally inward from the outer ends thereof so that the support members and resilient bars are securely balanced on the cross members and will not tip over the ends of the cross members.

The predetermined service position can be defined by stops between the cross members and abutment portions of the support members so that when stop members are engaged with the abutment portions, the side impact bed subassemblies are in their predetermined service positions. Further, once in the above-described predetermined service position, the subassemblies can be shifted slightly back toward their operative positions so that the stop members and abutment portions are slightly spaced from each other with apertures of the support members and cross members aligned to allow the subassemblies to be positively secured or fixed to the cross members as by bolting to resist any shifting of the support members while the impact bars are being replaced in a preferred predetermined service position of the subassemblies. Manifestly, the apertures also may be arranged in the support members and cross members so that they are aligned with the stop members and abutment portions engaged.

In another aspect, an impact bed assembly is provided for a troughed belt and has support members that can be slid on underlying cross members to an operative position under the belt via an outer slide interface between the support members and the cross members. However, rather than having to reach or climb under the belt to bolt inner portions of the support members to inner portions of the cross members in the operative position generally under a lowered, central area of the troughed belt so that the greater impact loads received thereat are transferred from the impact bars secured to the support members to the cross members bolted thereto, the present impact bed assembly has automatically operable inner load bearing mechanisms. The inner load bearing mechanism is automatically operable to transfer loading once the support members are slid to their operative positions without the need for bolting thereof to the cross members. This makes the installation of the support members and impact bars easier and faster than the prior bolted support members and cross members.

In another aspect, an impact bed assembly is provided that provides additional capacity for impact absorption without increasing the height of the impact bed assembly. In this regard, the impact bed assembly includes resilient impact bars each having an elongate resilient body and a backing plate connected under the resilient body with the backing plate having depending legs extending away from the resilient body and being configured to be mounted on rigid mounting pads spaced along the support members. In this manner, the depending legs of the backing plate do not restrict the compression of the resilient body as impact forces are absorbed thereby so as to maximize the impact absorption capacity of the resilient impact bars. Further, the spacing of the pads along the support members and gaps provided therebetween into which the depending legs are fit minimize the height of the impact bed assembly.

In another aspect of the invention, a dynamic impact bed assembly is provided that has increased impact absorption capacity over prior dynamic impact bed assemblies without requiring an increase in profile thereof and thus more space therefor under the belt. In prior dynamic bed assemblies, a cross member is rigidly connected to the conveyor frame structure and has a support member for an impact cradle resiliently mounted thereto so that the cross member generally provides a floor that limits the potential downward movement of the support members upon the application of impact forces thereto. Since the space between the conveyor frame members or stringers to which the cross member is secured is typically only approximately 8.5 to approximately 9.0 inches in vertical height, the vertical space for prior dynamic bed assemblies has been even further limited due to the fixed cross beams on the stringers.

Instead of rigidly mounting the cross members to conveyor frame members, the cross members of the preferred dynamic bed assemblies herein are incorporated in a dynamic frame assembly that is mounted to the conveyor frame members via resilient mounts so that the entire dynamic frame assembly including the cross members shifts downwardly when impact forces are received thereby. In this manner, the movement of the dynamic frame assembly is only limited by the freedom provided by the resilient mounting mechanisms, as there are no structural members rigidly connected to the conveyor frame structure extending below the dynamic frame assembly to limit the downward movement thereof. This allows the preferred dynamic bed assemblies to utilize more of the space between the carry and return runs of the conveyor belt which includes not only the space between the upper belt run and the upper surface of the stringers, but also the height of the stringers themselves, e.g. approximately 6 inches to approximately 8 inches.

In another aspect, the present dynamic impact bed assembly has bed frame members or support members that are resiliently mounted to the conveyor frame structure via outer resilient torsion mounts therebetween. The resilient torsion mounts are preferably located laterally beyond the support members. In this manner, when impact forces are taken by the dynamic impact bed assembly causing the support members to resilient shift downward, the outer resilient torsion mounts do not interfere with the range of resilient downward shifting that can be provided thereby. Accordingly, the range of travel for the dynamic impact bed assembly provided by the torsion mounts can be maximized. In addition, since space under the belt is not needed for the outer resilient torsion mounts, impact bars having relatively thick bodies of resilient material, e.g. approximately 3.0 to 4.5 inches thick, and preferably 3.5 to 4.5 inches thick, such as typically used in static impact bed assemblies, can be employed in the present dynamic impact bed assembly to further maximize the impact absorption capacity provided thereby.

BRIEF DESCRIPTION OF THE DRAWINGS

FIG. 3 is an enlarged elevational view of the impact bed assembly of FIG. 2 showing in phantom depending fin projections of the support members in their operative positions on the cross-member with pins of the cross member engaged in notches of the fin projections;

FIG. 4 is an elevational view similar to FIG. 3 but showing the smaller impact assembly of FIG. 1 with one of the support members slid to a predetermined service position on the cross member;

FIG. 4A is a perspective view of the impact bed assembly of FIG. 4 showing a pair of identical side impact bed subassemblies each including multiple support members and impact bars secured thereon with one of the subassemblies slide to the predetermined service position with a securing fastener connecting one of the support members of the assembly to the cross beam thereunder;

FIG. 9 is side elevational view of the support member showing a lowered central portion and an outer lateral portion having an inclined configuration up from the central portion;

FIG. 10 is a perspective view of the support member of FIG. 9 showing raised pad members spaced therealong;

FIG. 11 is a perspective view of the underside of one the impact bars showing an elastomeric body, a hard covering including a tapered upstream end, a rigid insert, and a backing plate with depending legs with notches for receiving the pad members of the support members;

FIGS. 14A and 14B are perspective views of a dynamic impact bed assembly having a dynamic mounting frame including rigidly connected cross members and support members, and torsion bias units for resiliently mounting the dynamic frame to the conveyor frame members;

FIG. 14C is an end elevational view of the dynamic impact bed assembly of FIGS. 14A and 14B showing the travel range of the dynamic impact bed assembly with the bottom of the cross members capable of traveling downward from just below the top of the stringer members of conveyor frame to approximately the center thereof;

FIG. 17 is a perspective view of a vibration mounting plate having the resilient pads secured thereto; and FIG. 18 is a perspective view of another support member having a single mounting plate with fastener receiving lugs for mounting the resilient impact bars thereto.

DETAILED DESCRIPTION OF THE PREFERRED EMBODIMENTS

Figure 1:
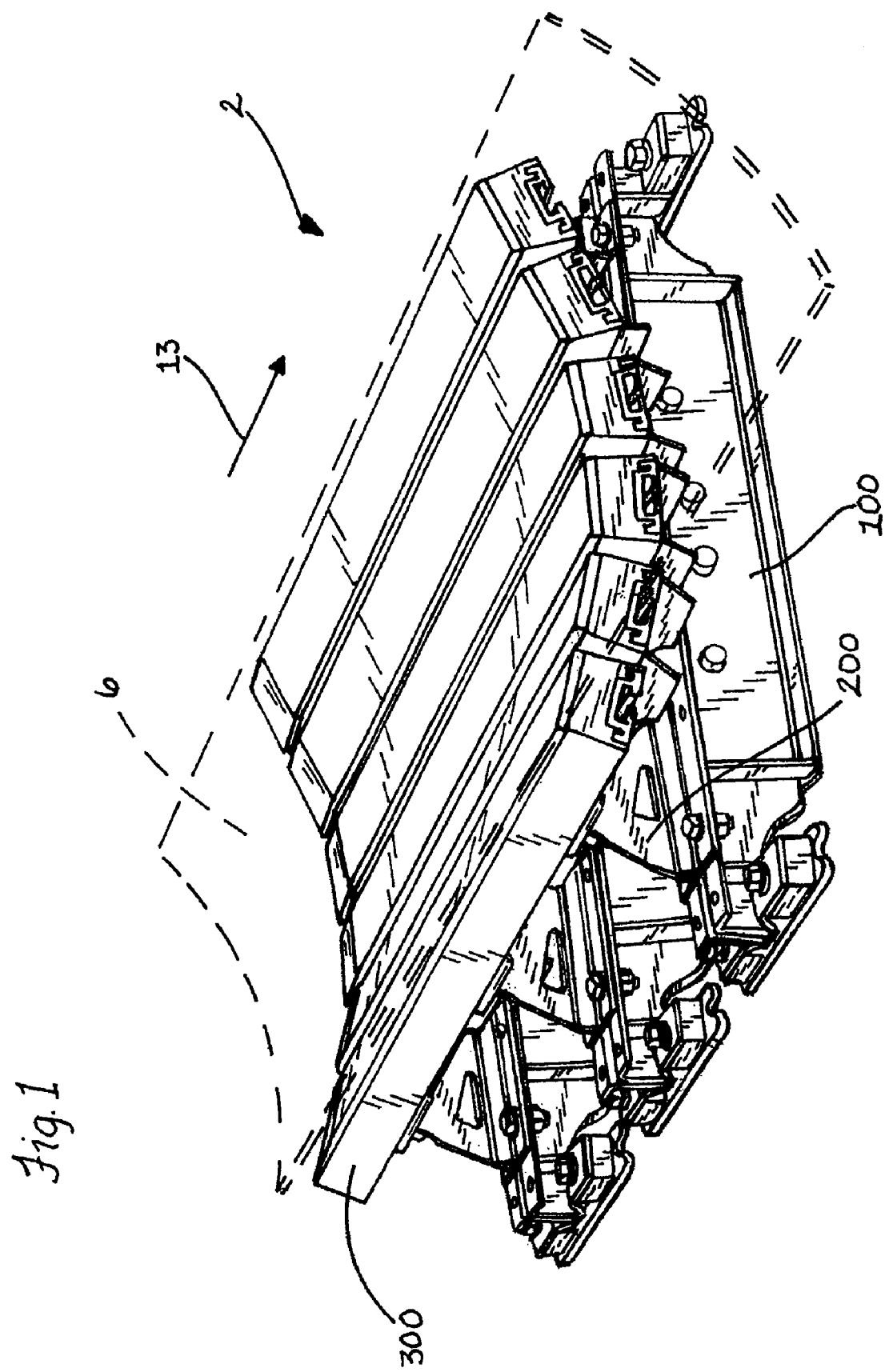
FIG. 1 is a perspective view of an impact bed assembly showing the conveyor belt in phantom supported on impact bars extending thereunder with the impact bars secured to support members and the support members secured on cross members.
Figure 2:
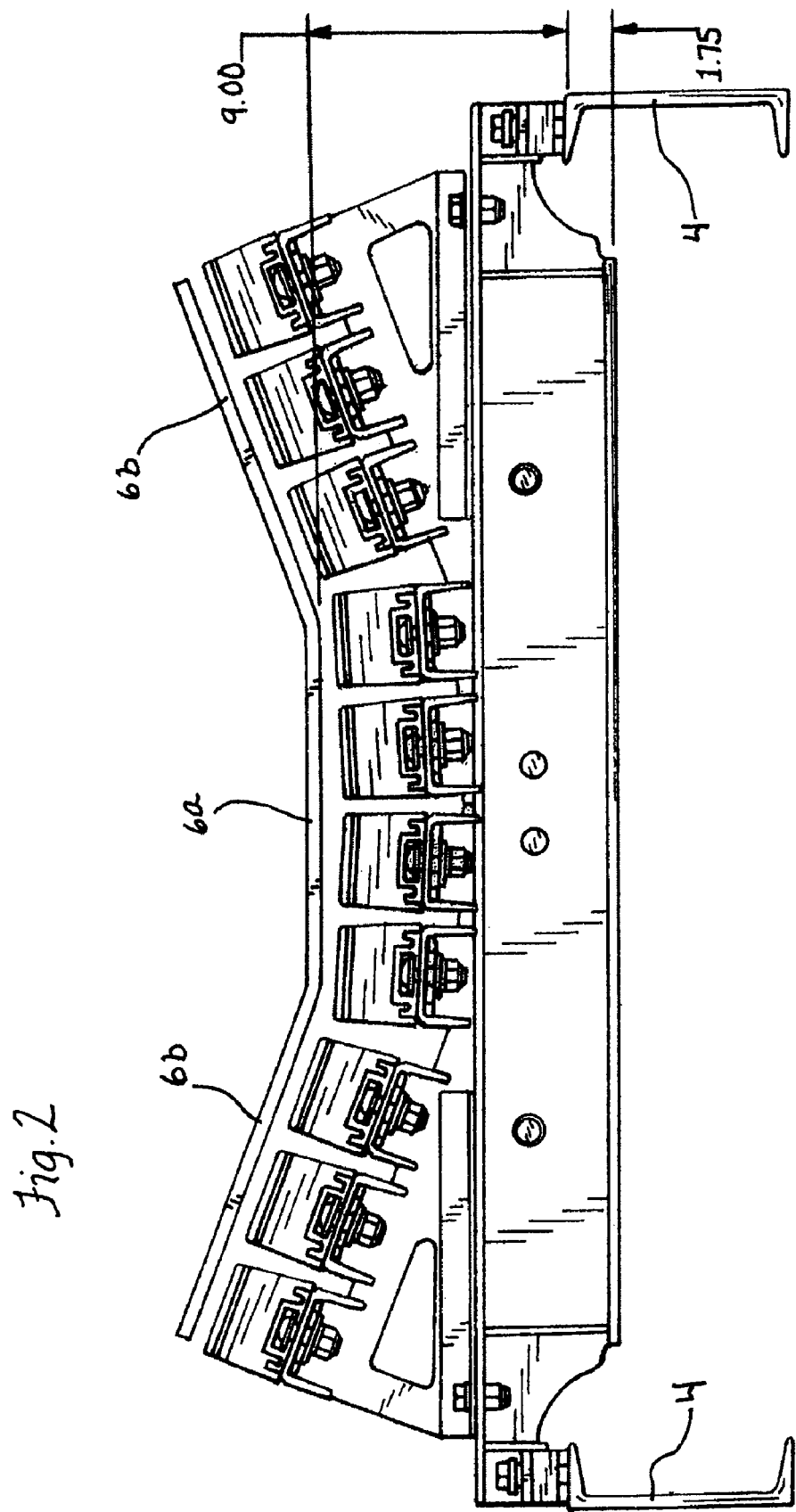
FIG. 2 is an end elevational view of another, larger impact bed assembly having a greater number of impact bars for larger width belts and showing one of the cross members mounted to conveyor frame structure on either side of the conveyor belt.

In FIGS. 1-3, static impact bed assemblies 2 are shown used for a conveyor belt 6 having a troughed configuration as provided by belt supports mounted to conveyor frame structure 4 (FIG. 2), such as idler rollers, that can be located both upstream and downstream along the longitudinal, belt travel direction 13 from the impact bed assembly 2. To accommodate the troughed configuration, the static impact bed assembly 2 includes a pair of identical side impact bed subassemblies 20, 22 supported on cross beam members 100 under the conveyor belt 6 in the area where items are typically dropped thereon. The impact bed assembly 2 is operable to absorb the impact forces so as to avoid damage to the conveyor belt 6 in the impact receiving area thereof. For this purpose, the side bed subassemblies 20, 22 each includes support members 200 on which resilient impact bars 300 are mounted. Although troughed belt configurations are far more common, it is conceivable that with untroughed belts only a single subassembly 20 would need to be used and it would not need outer inclined portions thereof as described hereinafter for the pair of bed subassemblies 20, 22.

The number and transverse spacing of the impact bars 300 as well as the sizing of the support members 200 and cross members 100 can vary as the width of the belt 6 varies. FIG. 1 illustrates a smaller impact bed assembly 2 for smaller width belts 6, e.g. 24 inch and 30 inch wide belts, with each subassembly 20, 22 having three impact bars 300, while FIGS. 2-4 illustrate a larger impact bed assembly 2 for larger width belts 6 with each subassembly 20, 22 having five impact bars 300. It is contemplated that subassemblies 20, 22 could carry up to seven impact bars 300 for very wide belts e.g. seventy-two inches in width. Also, for certain applications it may be desirable to have one of the subassemblies 20, 22 carry more impact bars 300 then the other subassembly 20, 22.

As seen best in FIG. 9, the support members 200 of the side bed subassemblies 20, 22 each include a generally lowered central portion 210 configured to be positioned below the central trough portion 6a of the belt 6 and a raised and inclined outer lateral portion 230 under inclined side portions 6b of the belt 6 configured to generally maintain the troughed configuration of the conveyor belt 6 as the conveyor belt 6 has impact forces applied thereto. Both the lowered central and raised outer lateral portions 210, 230 include impact bars 300 mounted thereon, as will be discussed further hereinafter.

To service and maintain the impact bed assembly 2 the support members 200 of the side impact bed subassemblies 20, 22 each are mounted on corresponding underlying cross members 100 via a slide interface 12 therebetween. The slide interface 12 allows an operator to slide the subassemblies 20, 22 from one side of the belt 6 in a lateral direction 11 generally orthogonal to the longitudinal, belt travel direction 13.

As shown in FIGS. 4 and 4A, the slide interface 12 is preferably formed between upper surfaces 111 of the cross members 100 and wing portions 280 extending laterally from either side of the support members 200 at the lower end of the outer portions 230 thereof so that the lower surfaces 281 of the lateral wing portions 280 can slide along the upper surfaces 111 of the cross members 100. The lower surfaces 281 of the lateral wing portions 280 preferably include a low friction coating, such as of a low friction plastic material, to reduce friction between the lower surfaces 281 of the lateral wing portions 280 and the upper surfaces 111 of the cross members 100 and to ease translation of the subassemblies 20, 22 along the cross member 100 between the operative and service positions thereof.

Guide structure 60 is provided between the support members 200 and cross members 100 to guide the support members 200 along the upper surface 111 of the cross members 100. As shown, the guide structure 60 includes guide channels 128 extending centrally along the cross members 100, and depending fin portions 282 of the support members 100 received in the guide channels 128. The depending fin portions 282 extend generally from forward operative abutment portions 209 located under the lower central portions 210 of the support members 200 to rearward service abutment portions 131 located at a predetermined lengthwise position below the raised outer portions 230 of the support members 200.

Figure 5:
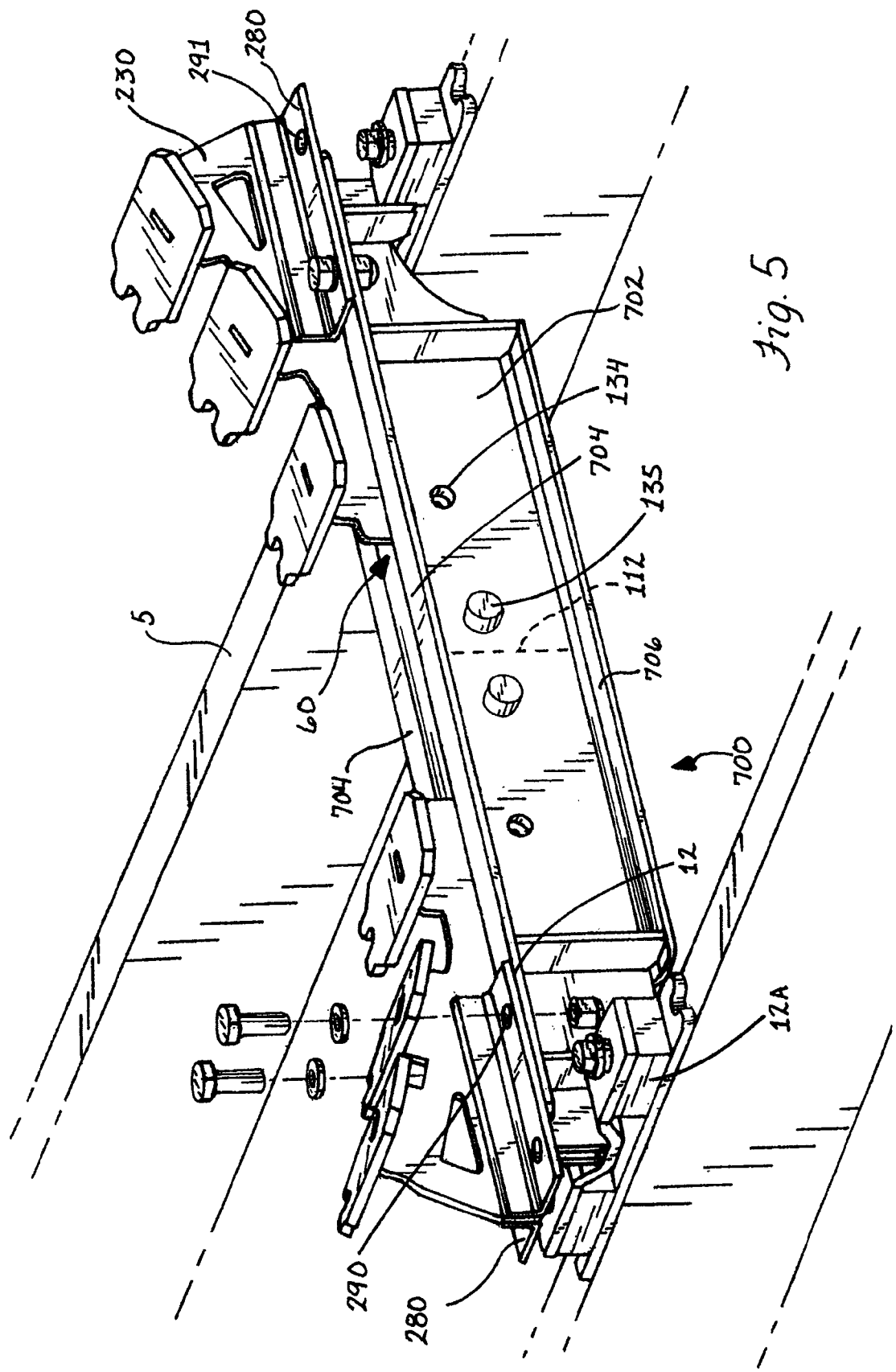
FIG. 5 is a perspective view showing a cross member having transverse, end mounting brackets for securing the cross member to conveyor frame side members with resilient pads therebetween.
Figure 5A:
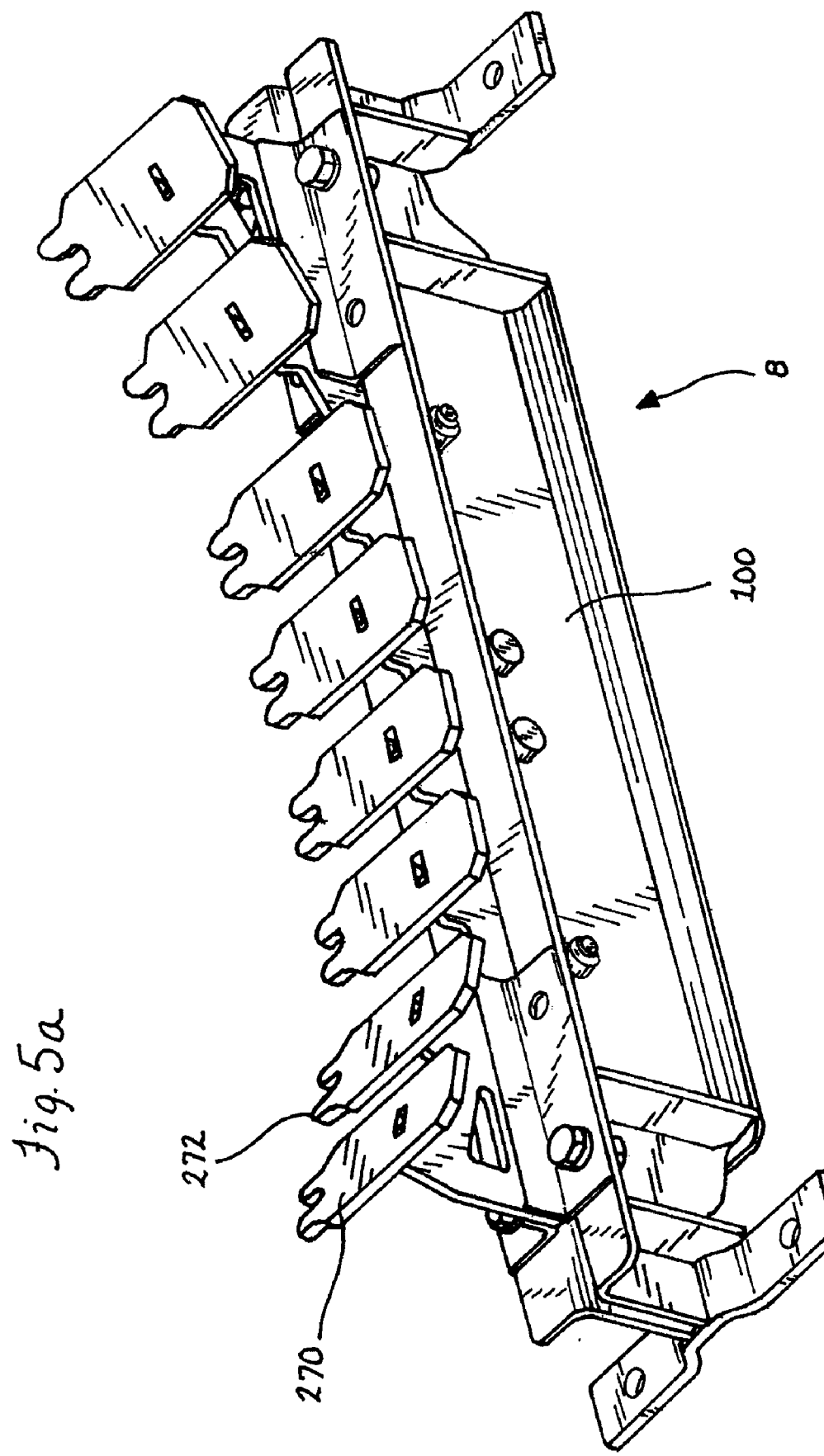
FIG. 5A is a perspective view of the cross member of FIG. 5 having the mounting brackets reversed when resilient pads are not used.
Figure 7:
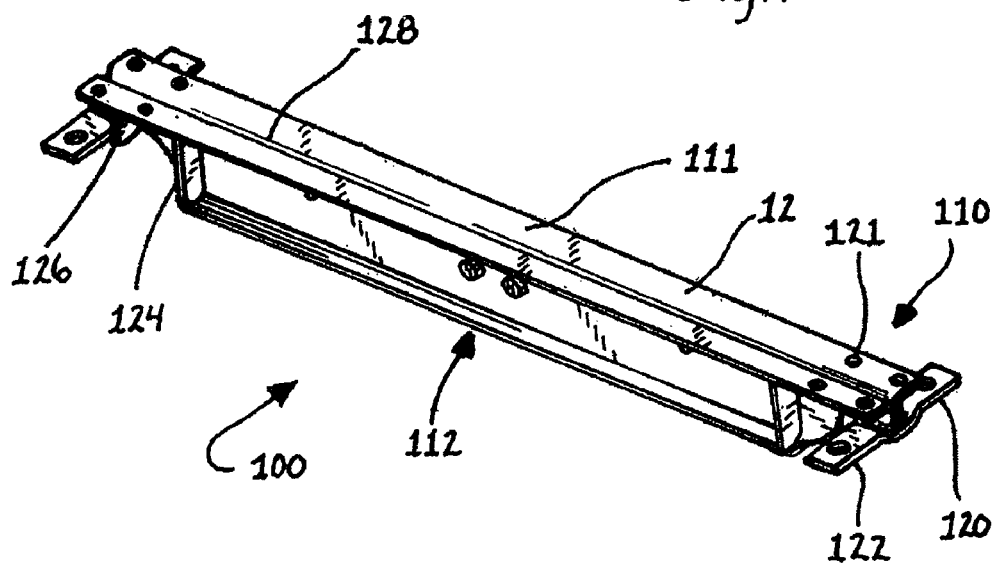
FIG. 7 is a perspective view of the cross member.

As best seen in FIGS. 5 and 7, the cross members 100 can each include a pair of adjacent channel members 700 that are connected so that their web walls 702 are spaced from each other to form the guide channel 128 therebetween. The channel members 700 have a generally C-shape cross sectional configuration so that upper and lower flanges 704 and 706 extend orthogonal to the web wall 702 thereof. The upper flanges 704 are level with each other and together form the upper surface 111 of each of the cross members 100 with each wing portion 280 of the support members 200 riding on the underlying upper flange member 704. To provide additional strength, the channel members 700 of the cross members 100 include rib portions 124 extending between the upper and lower flanges 704, 706 and rib portions 126 extending from the service stop members 130 to the upper flange 104.

The side impact bed subassemblies 20, 22 are configured to be translated along the cross members 100 between a predetermined operative position 8 and a predetermined service position 10. The predetermined service position 10 is located so that with the subassemblies 20, 22 slid from their operative positions 8 to their predetermined service positions 10, the center of mass 24 of the subassemblies 20, 22 will be located laterally inward from the outer ends 150, 152 of the cross members 100, as shown in FIG. 4. As a result, the subassemblies 20, 22 are securely balanced on the cross members 100 when shifted to their predetermined service positions. To keep an operator from shifting the subassemblies 20, 22 too far laterally outward, a stop is formed between the cross members 100 and support members 200. Each cross member 100 includes a pair of stop members 130, one at either end 150, 152 of the cross member 100, and the support members 200 include the service abutment portions 131 at the rear of the depending fin projections 282 of the support members 200. The service abutment portions 131 and service stop members 130 are arranged so that they will engage with one another with the subassemblies 20, 22 slid laterally outward beyond their predetermined service positions but before the subassemblies 20, 22 reach a point where their center of mass 24 is positioned beyond the ends 150, 152 of the cross member 100. In this regard, the impact bars 300 can be serviced with the stop members 130 engaged with the abutment portions 131 to form a predetermined service position thereat.

In the more laterally inward predetermined service position, the subassemblies 20, 22 preferably are positively secured to the cross members 100, such as by bolting. As shown in FIGS. 4, 4A and 5, in the predetermined service position 10 notch openings 284 of the depending fin projections 282 correspond to and are aligned with web throughbores 134 of the cross members 100. In addition, inner wing throughbores 290 of the wing portions 280 of the support members 200 correspond to and are aligned with upper surface throughbores 121 (FIG. 7) of the cross members 100. As shown, the notches 284 are aligned with the web throughbores 134 and the inner wing throughbores 290 are aligned with the upper surface throughbores 121 when the abutment portions 131 of the depending fin projections 282 are slightly spaced from the stop members 130 of the cross members 100.

In the predetermined service position 10, impact bars 300 will be vertically spaced from the conveyor belt 6 to provide an operator access to the impact bars 300 so that they can remove and replace the impact bars 300 without adjusting the conveyor belt 6. In particular, the laterally outermost impact bars 300 will be pulled out from under the belt 6 while the inner impact bars 300 will be pulled out from under the central lower belt portion 6a to be under the inclined belt portion 6b. The impact bars 300 mounted on the raised outer lateral portions 230 of the support members 200 are shifted out from under the conveyor belt 6 to permit an operator to remove and replace these impact bars 300. Further, at least one impact bar 300 mounted on the raised outer lateral portions 230 is positioned vertically above the cross members 100. The impact bars 300 mounted on the lowered central portions 210 of the support members 200 are positioned above the cross members 100 and generally under the inclined portion of 6b of the conveyor belt 6, as shown in FIG. 4. Generally, as shown in FIG. 4, the conveyor belt 6 will maintain a trough configuration after the subassemblies 20, 22 are translated toward the predetermined service position 10. As a result, a vertical spacing separates the conveyor belt 6 and the upper surfaces 301 of the impact bars 300 mounted on the lowered central portions 210 that is larger than the vertical spacing when the bars 300 are in their operative position, permitting an operator to remove and replace the impact bars 300 without having to adjust the conveyor belt 6.

The subassemblies 20, 22 are further configured to be secured to the cross members 100 in the operative position 8 so as to transfer impact forces applied to the impact bars 300 mounted on the subassemblies 20, 22 to the cross members 100. In particular, the subassemblies 20, 22 are automatically secured to the cross members 100 via automatically operable load bearing mechanisms 133 when they are slid to their operative positions. The automatically operable load bearing mechanisms 133 are positioned adjacent the centers 112 of the cross members 100 so that an operator need not reach under the lowered center 6a of the belt 6 to secure the subassemblies 20, 22 in the operable position 8. As is apparent, the lowered central area 6a of the belt receives the greatest impact loading applied to the conveyor belt 6. Thus, the load bearing mechanisms 133 are positioned to transfer a high level of the impact loading from the impact bars 300 mounted on the support members 200 to the cross members 100 therebelow.

As previously discussed, the support members 200 include lateral wing portions 280 which ride on the upper surfaces 111 of the cross members 100. Accordingly, the wing positions 280 also transfer impact loading received by the impact bars 300 to the cross members 100. However, since the wing portions 280 are at the laterally outer inclined portions 230 of the support members 200, laterally inner load bearing mechanisms such as the automatically operable load bearing mechanisms 133 herein are desirable where the impact loading is greatest on the impact bed assembly 2. Further, the illustrated wing portion 280 are formed as lower leg portions 280 of right angle members 900 that have upright leg portions 902 welded to vertical plate portions 271 of the support members 200. Accordingly, the laterally inner load bearing mechanisms 133 ensure most of the impact loading is transferred to the cross members 100 and then to the conveyor frame stringer members 4 thereby rather than being transferred at the welds between right angle members 900 and the support member 200.

Figure 8:
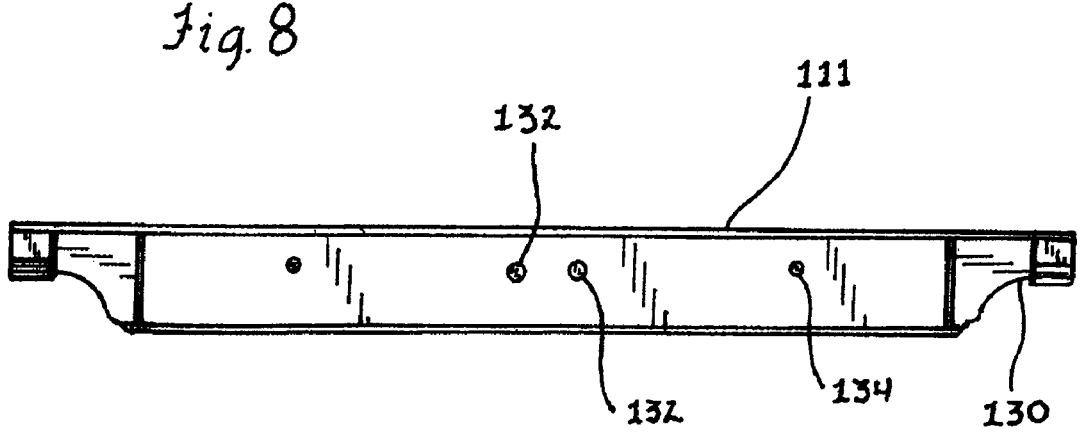
FIG. 8 is a side elevational view of the cross member.

As shown in FIGS. 3, 4 and 8, the automatically operable load bearing mechanisms 133 include pins 135 extending across the guide channel 128 of the cross members 100 and the forward notch openings 284 of the abutment portions 209 of the depending fin projections 282 configured to receive the pins 135 therein. The notch opening 284 is tapered for smoothly receiving the pin 135 therein as the subassemblies 20, 22 are slid to their operative positions so that there is an overhang portion 140 that engages and extends over the pin 135. The tapered notch opening 284 is configured to orient the subassemblies 20, 22 so that the pins 135 engage and bottom out in the notch opening 284 and are fully received therein thereby limiting the laterally inward translation of the subassemblies 20, 22. The overhang portions 140 engage on the pins 135 and transfer impact forces applied to the subassemblies 20, 22 to the cross members 100.

In their operative positions, the subassemblies 20, 22 are positively secured to the cross members 100, such as by bolting. In particular, the lateral wing portions 280 of the subassemblies 20, 22 each include an outer lateral throughbore 291 that will be aligned with throughbores 121 of the cross members 100 to accept a bolt 292 extending therethrough. In the operative position, the support members 200 of the subassemblies 20, 22 are further secured to the cross members 100 via outer fin throughbores 286 of each of the support members 200 aligned with the web throughbores 134 of the cross members 100.

Figure 6:
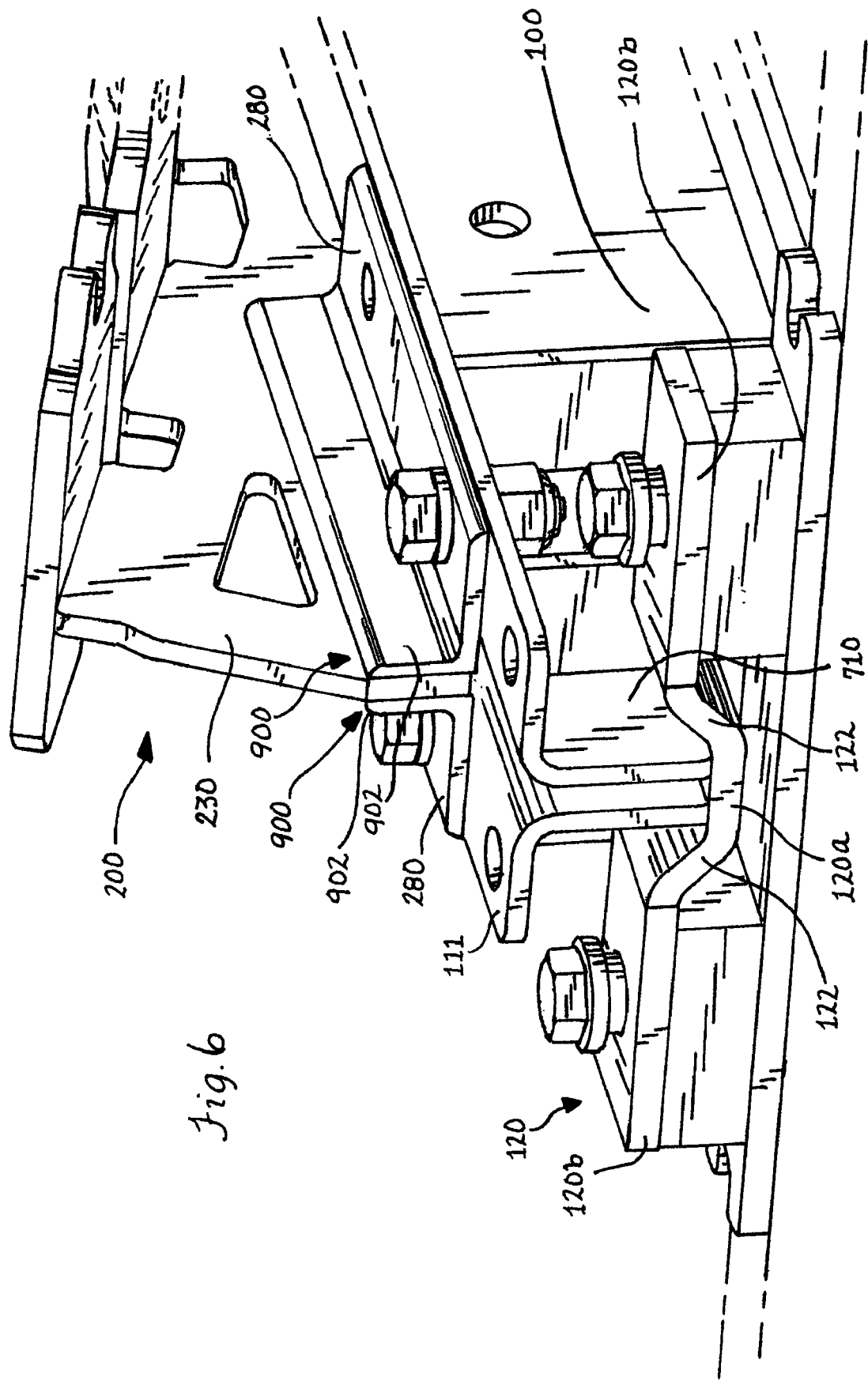
FIG. 6 is an enlarged, perspective view of the mounting bracket configured as in FIG. 5 showing raised side plate portions under which the resilient pads are fastened.

The cross members 100 are configured to be secured to the belt frame structure in the form of the side stringer members 4 extending parallel to the conveyor belt 6 along each side thereof for transferring the loading transferred to the cross members 100 to the belt frame stringers 4. The cross members 100 include end mounting brackets 120 at either end 150, 152 of the cross members 100 for mounting the cross members 100 to the stringers 4. Preferably, the mounting brackets 120 include a central, lower portion 120a that extends across the guide channel 128 to form the stop member 130. The channel members 700 each include end cut-outs in their web walls 702 to form end raised portions 710 with the bracket central portion 120a spanning and interconnecting the adjacent raised portions 710, as seen best in FIG. 6. In this manner, with the brackets 120 secured to the stringers 4, the main, central portion 712 of the channel members 700 will extend down from the end raised portions 710 so that the cross members 100 are hung from the stringer members 4 to extend below the upper surfaces thereof to keep the profile of the static impact bed assembly 2 to a minimum.

The mounting brackets also preferably include a pair of upwardly extending steps 122 so that there are raised side plate portions 120b on either side of the lowered central portion 120a to permit resilient pads 12a mounted to the vibration mounting plate 121 (FIG. 17) to be fastened between the mounting brackets 120 and the stringers 4 without increasing the height of the impact bed assembly 2. The resilient pads 12a absorb impact forces transferred to the cross members 100 from the subassemblies 20, 22 to reduce wear and damage to the conveyor belt 6 upon the application of impact forces thereto.

Figure 12:
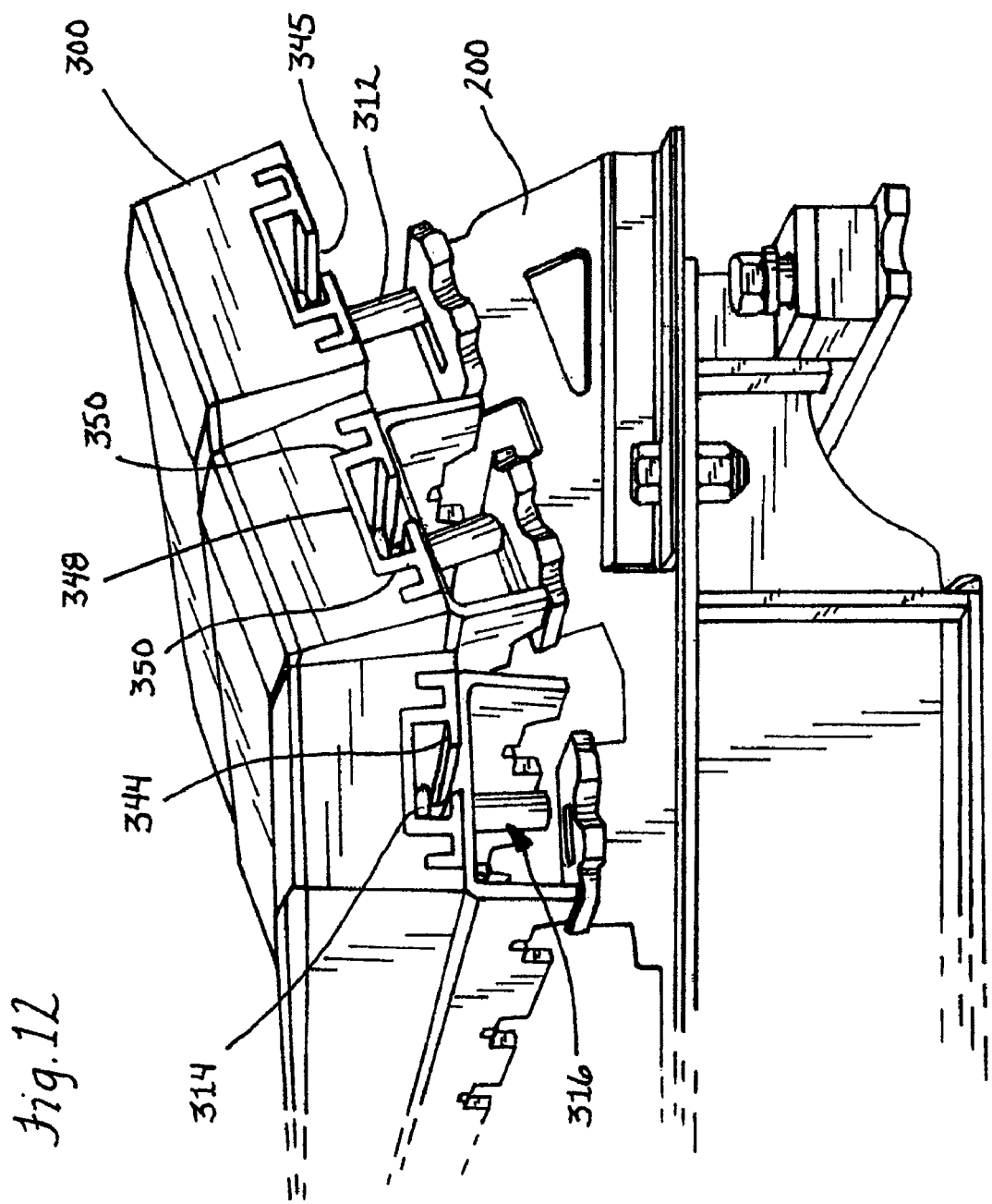
FIG. 12 is an a fragmentary perspective view of one of the side impact bed subassemblies showing the resilient impact bars secured on the support member with the legs of the backing plates extending down into gaps between the spaced raised pads of the support member.
Figure 13:
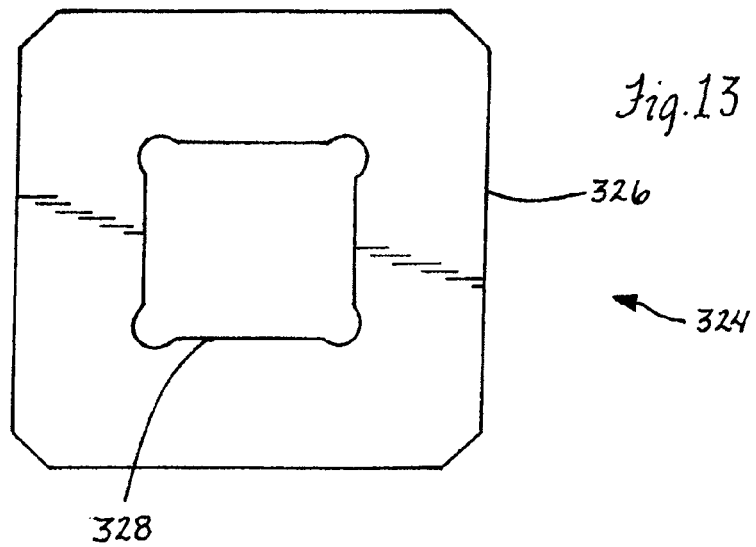
FIG. 13 is a plan view of an anti-rotation washer for being disposed about a polygonal portion under heads of fasteners that secure the impact bar insert to the backing plate thereof with the washer fitting between and closely adjacent to upstanding side walls of the impact bar inserts.
Figure 16:
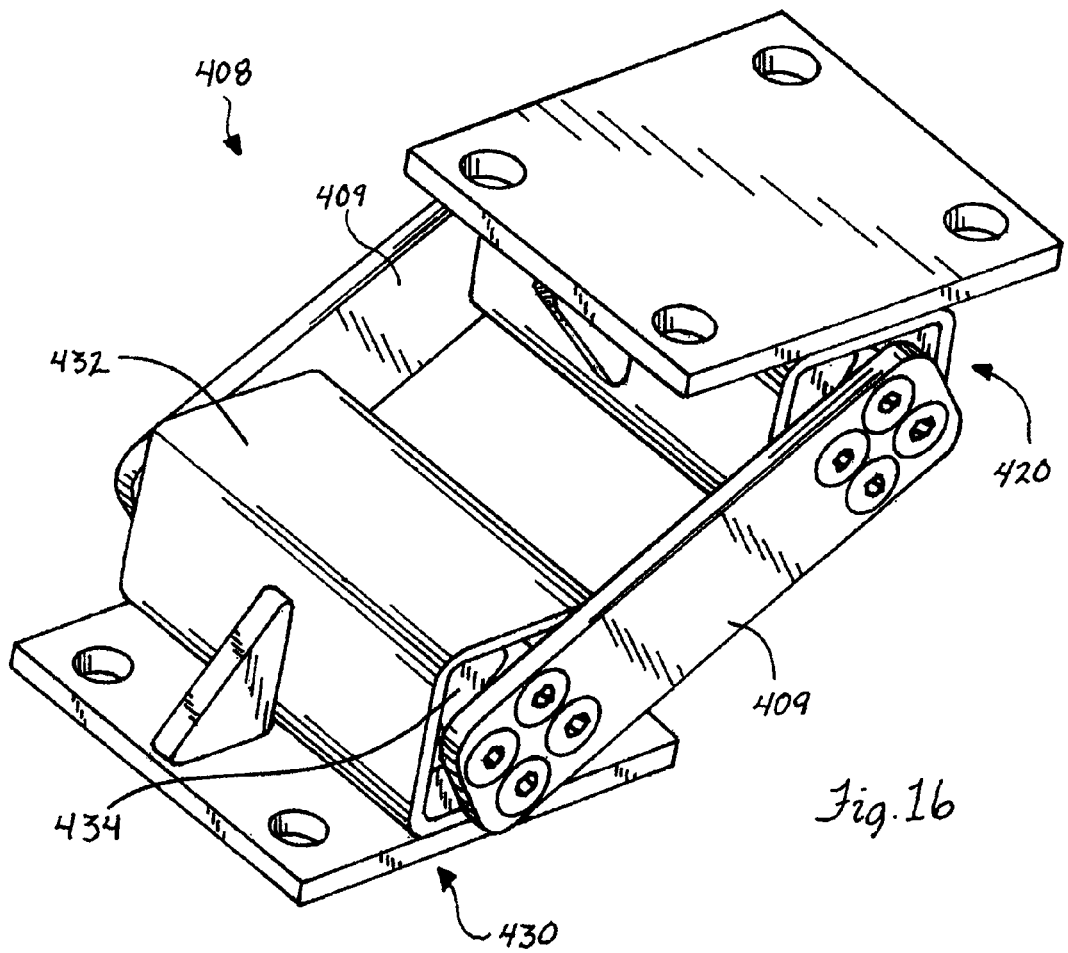
FIG. 16 is an enlarged perspective view of one of the pairs of linked torsion bias units showing the units being vertically offset and interconnected by diagonal link members.

The impact bars 300 are configured to absorb the impact forces applied thereon to minimize any damage to the conveyor belt 6. The impact bars 300 are mounted to the support members 200 to extend in the travel direction 13 of the conveyor belt 6. The impact bars 300 include an elastomeric body 302 extending the length of the impact bars 300 and include a metal insert 340 therein, as shown in FIGS. 11 and 12. The metal insert 340 includes an upper wall 348, sidewalls 350 and spaced lower flanges 344 defining a longitudinal slot 345 extending the length of the impact bars 300.

The impact bars 300 include backing plates 360 for securing the elastomeric bodies 302 to the support members 200 of the subassemblies 20, 22 and maximize the impact absorption thereof. The backing plates 360 extend along the lower surface 308 of the elastomeric bodies 302. The backing plates 360 include a series of apertures 361 extending therethrough aligned with the slot 345 of the metal insert 340 for securing the impact members 300 to the support members 200, as will be described more fully hereinafter.

The backing plates 360 preferably include an upstanding tab 362 extending from a downstream end 363 of the backing plates 360 and generally orthogonal to the length of the impact bars 300. The upstanding tabs 362 engage downstream ends of the elastomeric bodies 302 to resist migration of the elastomeric bodies 302 as the conveyor belt 6 travels therealong.

As shown in FIGS. 11 and 12, the impact bars 300 further include connection mechanisms 316 to mount the elastomeric bodies 302 to the backing plates 360 and the support members 200 of the subassemblies 20, 22. In particular, the connection mechanisms 316 are a bolt 312 having a head portion 314, a polygonal shank portion (not shown) and a threaded shank portion 318. The head portion 314 is configured to be received in the space defined by the upper wall 348, sidewalls 350 and spaced lower flanges 344 of the metal insert 340. Further, the polygonal shank portion is configured to be received closely between the spaced lower flanges 344 so as to resist rotation of the bolt 312. The threaded shank portion 318, which extends from the shank portion, extends through the apertures 361 of the backing plates 360. Further, each securing mechanism 316 includes an anti-rotation member 324, such as a washer, having straight inner edges 328 configured to receive the polygonal shank portion therein and a flat outer edge 326 configured to engage the sidewalls 350 of the metal insert 340 to resist rotation of the bolt 312 during conveyor belt operations.

As best seen in FIG. 11, the backing plates 360 preferably have a generally inverted U-shaped configuration including depending legs 364 extending generally orthogonally to the length of the backing plates 360 and away from the elastomeric bodies 302. The legs 364 do not extend up alongside the elastomeric bodies 302 so as to not restrict the compression of the elastomeric bodies upon the application of impact forces thereto. Further, by not positioning the legs 364 adjacent the elastomeric body 302 debris and other particulate will not settle therebetween.

As previously discussed, the support members 200 of the subassemblies 20, 22 have the impact bars 300 mounted thereon. As shown in FIGS. 9 and 10, the support members 200 preferably include vertical plate portions 271 having upper edges 216, 232 of the lowered central and raised outer lateral portions 210, 230 with mounting pads 270 extending generally normal to the vertical plate portions 271 and parallel to the direction of travel 13 of the conveyor belt 6. The mounting pads 270 each extend longitudinally along a longitudinal axis 273 and have a fastener receiving slot 272 formed by spaced lugs 272a on either side thereof with both the pads 270 and slots 272 extending parallel to the direction of travel of the conveyor belt 13. The lugs 272a and slots 272 formed thereby are configured to extend from the upstream ends 138 of the mounting pads 270 and receive a bolt 312 therein.

In addition, the mounting pads 270 are spaced from each other to receive the depending legs 364 of the backing plates 360 therebetween. As shown in FIG. 11, the depending legs 364 of the backing plate 360 preferably include notches 366 therein configured to guide the impact bars 300 onto the mounting pads 270. Further, the notches or cut-outs 366 are configured to extend beyond the adjacent upper surfaces 216, 232 of the support members 200.

The impact bars 300 are further configured so as to minimize wear and damage to the conveyor belt 6 as the belt 6 travels thereacross in the operable orientation 8. Preferably the impact bars 300 include a relatively thin, wear resistant plastic covering 304 atop the elastomeric body 302 and configured to be engaged by the conveyor belt 6. Further, the plastic covering 304 includes a tapered upstream end 306 configured to urge the conveyor belt 6 upward as the conveyor belt 6 travels thereacross.

Further, the impact bars 300 are configured to ease translation of the subassemblies 20, 22 toward a position under the belt 6. As shown in FIGS. 2 and 9, the impact bars 300 are mounted at an angle relative to the upper surface 111 of the cross member 100 to urge the conveyor belt 6 upwardly upon translation of the subassemblies 20, 22 toward the center 112 of the cross members 100. In particular, the upper surfaces 232 of the support members 200 are configured to define an angle A. Additionally, upper edge surfaces 216 of the lower central portions 210 are configured to mount the impact bars 300 thereon at an angle B less than the angle A defined by the raised upper portion 230, e.g. such as 3 degrees off the upper surfaces 111 of the cross members 100.

In another aspect of the invention, a dynamic impact bed assembly 400 is provided to transfer impact loading applied to the conveyor belt 6 to the stringer members 4. The dynamic impact bed assembly 400 includes a dynamic frame assembly 401 which has structural components configured to extend below the belt 6 and be resiliently mounted on either side of the belt 6 to the conveyor frame stringer members 4. The dynamic frame assembly 401 is resiliently mounted to the conveyor frame stringer members 4 so that the entire dynamic frame assembly 401 shifts as a single unit as impact forces are applied to the conveyor belt 6 thereabove.

Accordingly, the dynamic frame assembly 401 herein forms an integrated bed. As illustrated in FIGS. 14A-14C and 15, the dynamic frame assembly 401 preferably includes longitudinal members 402 extending parallel to the direction of travel 13 of the conveyor belt 6 and cross stabilization beams 404 rigidly connected to the ends 450 of the longitudinal members 402 extending below and transverse to the direction of travel 13 of the conveyor belt 6. The longitudinal members 402 preferably each include a tab mount 458 at each end 450 thereof to which the stabilization beams 404 are secured.

Figure 14B:
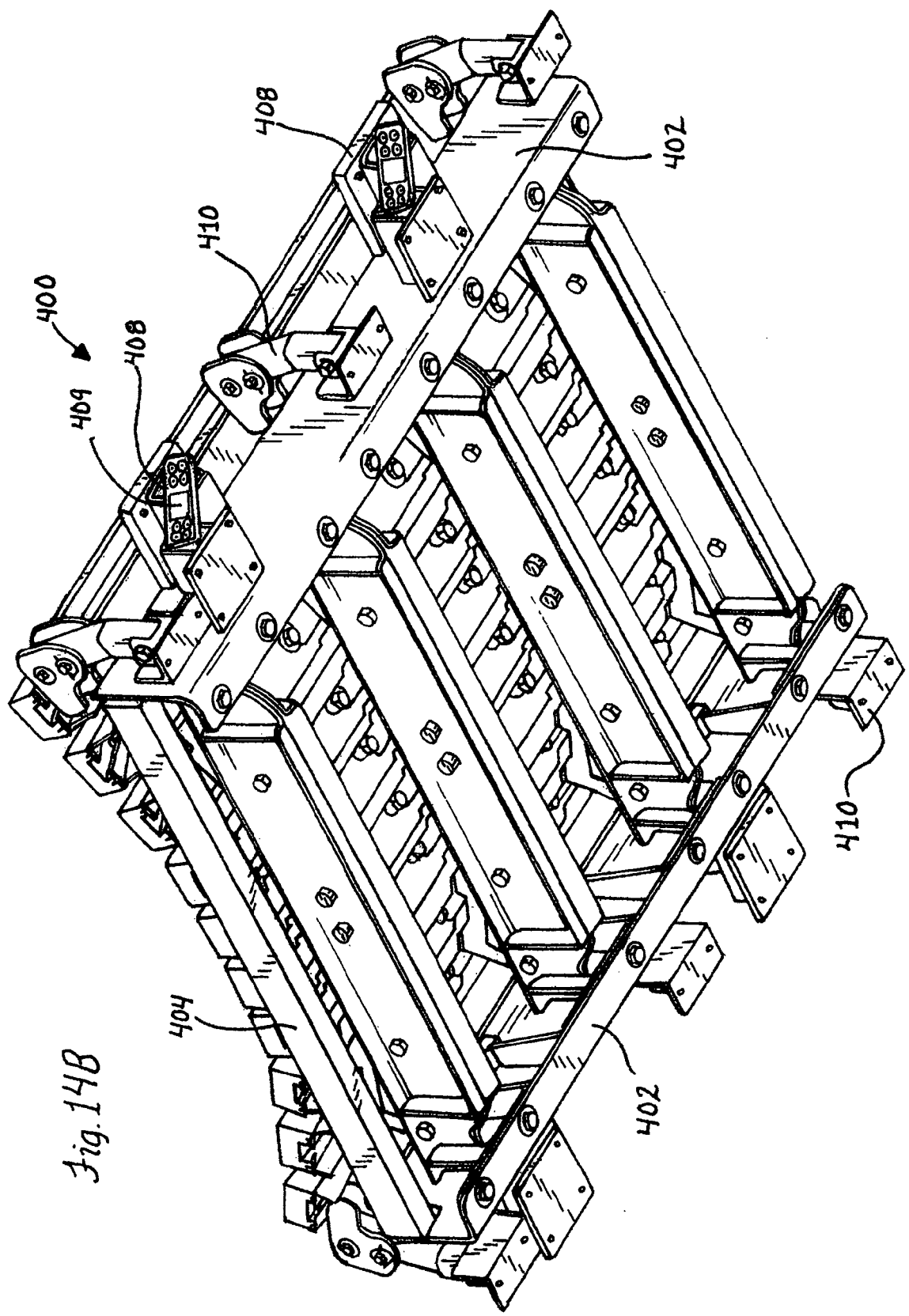
Figure 15:
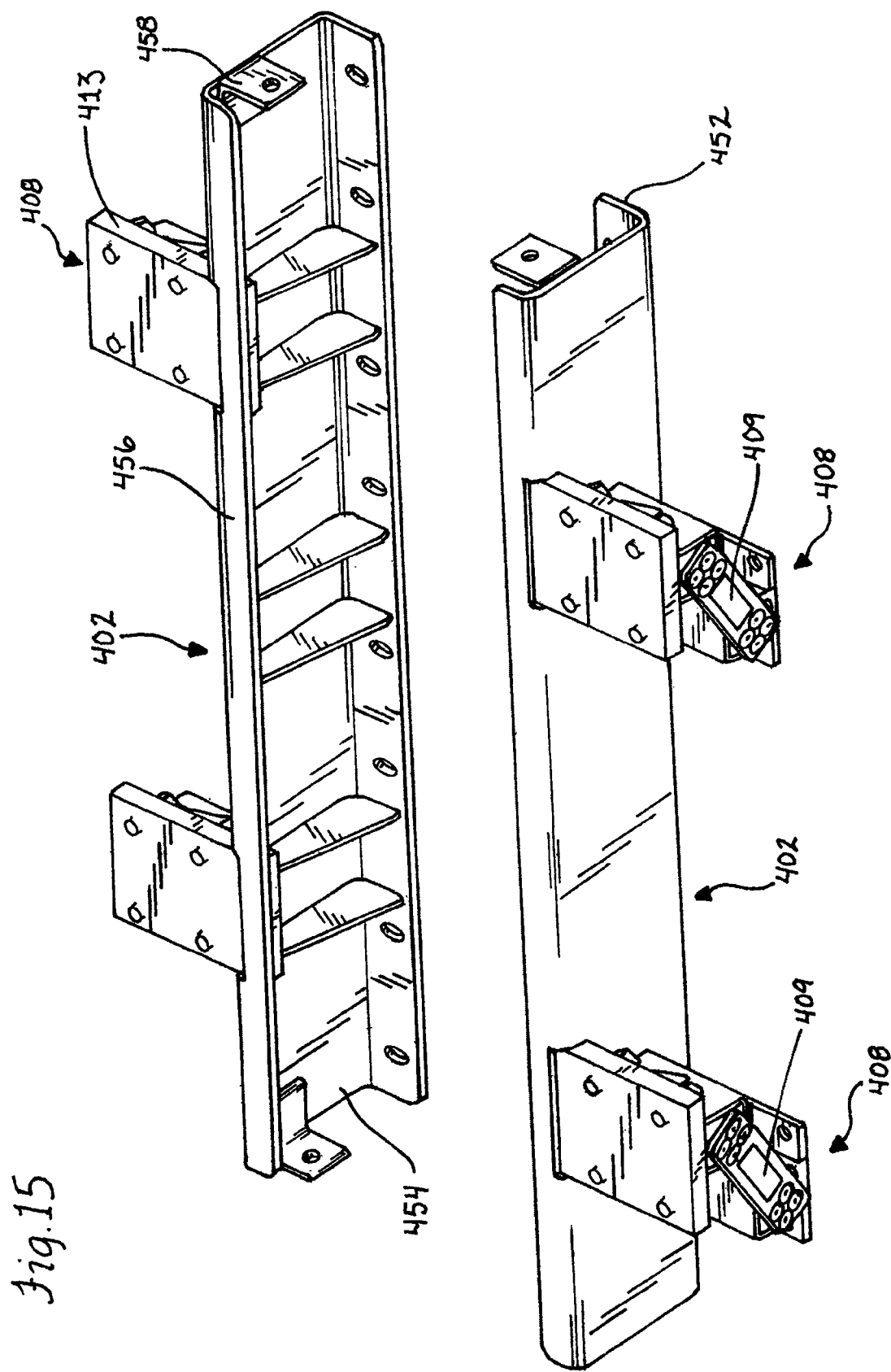
FIG. 15 is a perspective view of longitudinal beam members of the dynamic bed frame assembly including outbound mounting plates for pairs of linked torsion bias units to be mounted to the stringer members.

As shown in FIGS. 14A-14C, the dynamic frame assembly 401 further includes cross members 100 and support members 200 rigidly connected together to form a rigid support grid for the impact bars 300, which are preferably substantially of the same construction as the corresponding components of the static bed assemblies 2 so as to be interchangeable therewith. The cross members 100 are configured to be mounted on the lower flange 452 of the longitudinal members 402, with the ends 150, 152 of the cross members 100 positioned adjacent the web 454 of the longitudinal members 402 and below upper flange 456 of the longitudinal members.

The dynamic frame assembly 401 further includes outboard mounting plates 413 of the longitudinal members 402 configured to extend transversely outward from the longitudinal members 402 and above the conveyor frame stringers 4. The outboard mounting plates 413 are connected to a resilient mount assembly 408, which is further connected onto the conveyor frame stringers 4. As a result, as shown in FIGS. 14A-14C, the resilient mount assemblies 408 are positioned above the conveyor frame stringers 4 at a height that is generally aligned with the cross members 100.

The resilient mount assemblies 408, as shown, preferably include offset upper torsion bias units 420 and lower torsion bias units 430 interconnected by diagonal torsion links 409. The resilient mount assemblies 408 are configured such that, upon the application of an impact force to the dynamic frame assembly 401, the upper torsion bias units 420, which are connected to and under the outboard mounting plate 413 of the longitudinal member 402, are urged downward toward but offset from the lower torsion bias units 430. As a result, the entire dynamic frame assembly 401 travels downward between the conveyor frame stringers 4 and thereby absorbs impact forces applied to the conveyor belt 6.

The torsion bias units 430 are preferably standard Rosta units that include an outer housing 432 in which rubber or resilient material 434 is provided at the corners for urging a central bar connected to the link members 409 back to the rest position when the bar is turned in the housing 432 due to impact forces applied to the dynamic frame assembly 400.

The bottoms of cross members 100 can travel from just below the upper surface 5 of the conveyor frame stringers 4 in the absence of impact loading to a maximum travel distance when high impact loads are received that is at approximately the center of the vertical height of the stringer members 4, as shown in FIG. 14C. Preferably, the maximum travel distance of the dynamic bed assembly 400 is at least approximately 0.875 inches. In cooperation with the impact bars 300, the elastomeric bodies of which provide approximately 0.625 inches of compression travel distance, the conveyor belt 6 is allowed a travel distance of at least 1.5 inches.

In a further preferred embodiment, the maximum deceleration distance travel is about 2.5 inches. While a larger deceleration distance is possible, the benefits of the increased deceleration distance are marginal after 2.5 inches. In addition, the increased distance contributes to stretching of the belt 6, thereby increasing the likelihood of damage. Additionally, given the space constraints created by the stringer members 4, and the belt 6, in particular the return section of the belt 6, and any other rigid obstructions a maximum distance of 2.5 inches is preferred.

To ensure a proper trough configuration, the dynamic bed assembly 400 includes rigid lateral support assemblies 410 mounted along each side of the belt 6 on the conveyor frame structure 4. The rigid lateral support assemblies 410 include at least impact bar 300 mounted thereon and cooperate with the dynamic frame assembly 401 to define the trough configuration with the impact bars 300 mounted on the dynamic frame assembly 401.

Preferably, the dynamic impact bed 400 includes a plurality of resilient mount assemblies 408 along each longitudinal member 402. As illustrated, the number of resilient mounts 408 connected to each longitudinal member 402 is less than the number of ends 150, 152 of the cross members 100 mounted to the longitudinal member 402. Preferably, the resilient mounts 408 are positioned between the ends 150, 152 of adjacent cross members 100.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. An impact bed assembly for a conveyor belt, the impact bed assembly comprising:
   a cross member extending below and across the belt for being mounted to conveyor frame structure on either side of the belt;
   a plurality of resilient impact bars extending underneath and along the conveyor belt for absorbing impact forces against the belt;
   a support member on which the impact bars are mounted; and
   a slide interface between the cross member and the support member configured to allow the support member to be slidably shifted between an operative position on the cross member with the impact bars engaged under the belt to absorb impact forces and a predetermined service position on the cross member with the support member supported by the cross member with the impact bars accessible out from under the conveyor belt for servicing thereof,
   wherein the cross member and the support member have a stop therebetween which is operable to define the predetermined service position of the support member with the support member slid on the cross member thereto.

2. An impact bed assembly for a conveyor belt, the impact bed assembly comprising:
   a cross member extending below and across the belt for being mounted to conveyor frame structure on either side of the belt;
   a plurality of resilient impact bars extending underneath and along the conveyor belt for absorbing impact forces against the belt;
   a support member on which the impact bars are mounted; and
   a slide interface between the cross member and the support member configured to allow the support member to be slidably shifted between an operative position on the cross member with the impact bars engaged under the belt to absorb impact forces and a predetermined service position on the cross member with the support member supported by the cross member with the impact bars accessible out from under the conveyor belt for servicing thereof,
   wherein the cross member includes a channel, the support member includes a depending fin projection that fits in the channel, and the cross member has a transverse stop wall that extends laterally across the channel against which the depending projection engages with the support member slid to the predetermined service position thereof.

3. An impact bed assembly for a conveyor belt, the impact bed assembly comprising:
   a cross member extending below and across the belt for being mounted to conveyor frame structure on either side of the belt;
   a plurality of resilient impact bars extending underneath and along the conveyor belt for absorbing impact forces against the belt;
   a support member on which the impact bars are mounted; and
   a slide interface between the cross member and the support member configured to allow the support member to be slidably shifted between an operative position on the cross member with the impact bars engaged under the belt to absorb impact forces and a predetermined service position on the cross member with the support member supported by the cross member with the impact bars accessible out from under the conveyor belt for servicing thereof,
   wherein the cross member and the support member have a pair of stops formed therebetween with one of the stops defining the operative position of the support member at a predetermined position on the cross member and the other stop defining the predetermined service position of the support member on the cross member.

4. The impact bed assembly of claim 3, wherein the cross member includes a channel, the support member includes a depending fin projection that fits in the channel, and the stop defining the operative position comprises a transverse pin in the channel and a notch in the depending fin projection so that with the support member slid to the predetermined operative position on the cross member, the pin is received in the notch in engagement with the depending fin projection of the support member.

5. An impact bed assembly for a conveyor belt, the impact bed assembly comprising:
   a cross member extending below and across the belt for being mounted to conveyor frame structure on either side of the belt;
   a plurality of resilient impact bars extending underneath and along the conveyor belt for absorbing impact forces against the belt;
   a support member on which the impact bars are mounted; and
   a slide interface between the cross member and the support member configured to allow the support member to be slidably shifted between an operative position on the cross member with the impact bars engaged under the belt to absorb impact forces and a predetermined service position on the cross member with the support member supported by the cross member with the impact bars accessible out from under the conveyor belt for servicing thereof,
   wherein the support member has outer and inner apertures, and the cross member has an outer aperture with the apertures disposed so that with the support member in the operative position the support member outer aperture is aligned with the cross member outer aperture for receiving a fastener therethrough for securing the support member in the operative position on the cross member, and in the predetermined service position the support member inner aperture is aligned with the cross member outer aperture to receive a fastener therethrough for securing the support member in the predetermined service position on the cross member.

6. An impact bed assembly for a conveyor belt, the impact bed assembly comprising:
- a cross member extending below and across the belt for being mounted to conveyor frame structure on either side of the belt;
- a plurality of resilient impact bars extending underneath and along the conveyor belt for absorbing impact forces against the belt;
- a support member on which the impact bars are mounted; and
- a slide interface between the cross member and the support member configured to allow the support member to be slidably shifted between an operative position on the cross member with the impact bars engaged under the belt to absorb impact forces and a predetermined service position on the cross member with the support member supported by the cross member with the impact bars accessible out from under the conveyor belt for servicing thereof,
- wherein the support member has an inner portion for being slid to a central area under the belt with the support member in the operative position, the inner portion including an open ended notch, and the cross member including a load bearing member at a predetermined fixed position under the central area of the belt such that the load bearing member is engaged in the notch with the support member slid to the operative position thereof with the open ended notch allowing the support member to be slid to the predetermined service position without requiring access to and removal of the load bearing member from the cross member.

7. The impact bed assembly of claim 6 wherein the impact bars include at least one outer impact bar for being disposed under an outer side area of the belt and at least one inner impact bar for being disposed under the central area of the belt with the outer and inner impact bars being inclined toward the center area of the belt to provide clearance from the belt as the support member is slid from the operative position to the predetermined service position.

8. The impact bed assembly of claim 7 wherein the outer impact bar is inclined by a greater amount than the inner impact bar.

9. An impact bed assembly for a conveyor belt, the impact bed assembly comprising:
- a cross member extending below and across the belt for being mounted to conveyor frame structure on either side of the belt;
- a plurality of resilient impact bars extending underneath and along the conveyor belt for absorbing impact forces against the belt;
- a support member on which the impact bars are mounted; and
- a slide interface between the cross member and the support member configured to allow the support member to be slidably shifted between an operative position on the cross member with the impact bars engaged under the belt to absorb impact forces and a predetermined service position on the cross member with the support member supported by the cross member with the impact bars accessible out from under the conveyor belt for servicing thereof,
- wherein the cross member has a pair of the support members slidable thereon from either side of the belt, the cross member comprises a plurality of cross members and corresponding pairs of the support members, and the plurality of impact bars extend transverse to the cross members and support members with each impact bar mounted to multiple support members.

10. An impact bed assembly for a troughed conveyor belt where impact loading on the belt is generally greatest in a lowered central area of the belt relative to outer inclined sides of the belt, the impact bed assembly comprising:
- a plurality of cross members extending below and across the belt for being mounted to conveyor frame structure on either side of the belt;
- a plurality of resilient impact bars extending underneath and along the conveyor belt for absorbing impact forces against the belt with the impact bars including at least one outer bar for being engaged under one of the outer inclined belt sides and at least one inner bar for being engaged under the belt central area;
- a plurality of support members with each support member being on one of the cross members for supporting at least one outer bar and at least one inner bar extending transversely thereacross;
- an outer slide interface between each of the support members and corresponding cross members; and
- automatically operable inner load bearing mechanisms of the cross members and support members located under the belt central area so that with the support members slid to an operative position under the belt on the corresponding cross members, the inner load bearing mechanisms are automatically operable to transfer the greater impact loads from the belt central area to central portions of the cross members thereunder with the slide interface therebetween generally only transferring the lighter impact loading from the outer inclined belt side to an outer portion of the cross member thereunder.

11. The impact bar assembly of claim 10 wherein the automatically operable inner load bearing mechanisms are configured to be automatically inoperative so that access to the inner load bearing mechanisms is not required to permit sliding of the support members in a direction out from under the belt.

12. The impact bar assembly of claim 10 wherein the automatically operable inner load bearing mechanisms each comprise a fixed rod of the cross members, and an abutment portion of the support members that engages the rod and includes an overhang portion that engages on the rod with the support members slid to the operative position thereof.

13. The impact bar assembly of claim 10 wherein the inner load bearing mechanisms each comprise a plate of the support members having a notch therein and a fixed rod of the cross members so that the rods are received in the plate notches with the support members slid to the operative position with the notches allowing the plates to be shifted off of the corresponding rods upon sliding of the support members away from the operative positions thereof.

14. An impact bar device for a conveyor belt impact bed assembly, the impact bar device comprising:
- an elongate resilient body having opposite upstream and downstream ends for being disposed under a conveyor belt in engagement therewith to absorb impact forces on the belt and oriented to extend longitudinally in a downstream travel direction of the belt;
- an elongate rigid backing plate having an elongate flat portion with opposite upstream and downstream ends, the flat portion having the resilient body supported thereon for being mounted to the impact bed assembly; and an upstanding tab of the backing plate that is oriented to extend upwardly from the downstream end of the elongate flat portion and is integral therewith so that the backing plate including the elongate plate portion and the upstanding tab thereof is of a one-piece construction with the upstanding tab arranged to engage the corresponding downstream end of the elongate resilient body to resist downstream migration of the elongate resilient body relative to and along the elongate backing plate as the elongate resilient body supports the belt traveling in the downstream travel direction thereover.

15. The impact bar device of claim 14 wherein the elongate resilient body upstream end has an inclined surface that tapers upwardly in the downstream travel direction.

16. The impact bar device of claim 15 wherein the resilient body includes a main elastomeric lower body portion of elastomeric material and a harder upper cover layer of a plastic material with the inclined surface being formed on the plastic, upper cover layer.

17. The impact bar device of claim 14 wherein the elongate resilient body includes a metallic insert to which the elongate rigid backing plate is fastened.

18. An impact bar device for a conveyor belt impact bed assembly, the impact bar device comprising:
an elongate resilient body for being disposed under a conveyor belt in engagement therewith to absorb impact forces on the belt and oriented to extend longitudinally in a downstream travel direction of the belt;
an elongate rigid backing plate for supporting the resilient body and being mounted to the impact bed assembly;
an upstanding tab of the backing plate adjacent a downstream end of the elongate resilient body to resist migration of the body along the elongate backing plate,
wherein the elongate resilient body includes a metallic insert to which the elongate rigid backing plate is fastened, and the insert has spaced lower flanges, a lower central opening between the flanges, and upstanding side walls extending upwardly from the lower flanges;
a fastener having a head for seating on the flanges and a threaded shank for extending through an aperture in the backing plate and the insert central opening;
an anti-rotation member on the shank adjacent the head seated on the spaced lower flanges; and
opposite sides of the anti-rotation member sized to be disposed closely adjacent the upstanding side walls of the insert to keep the fastener from rotating as the elongate resilient body absorbs impact forces on the belt.

19. An impact bed assembly for generally being installed under a conveyor belt, the impact bed assembly comprising:
a plurality of cross members below and extending laterally across the belt for being mounted to conveyor frame structure on either side of the belt;
a plurality of resilient impact bars extending longitudinally underneath and along the conveyor belt for absorbing impact forces against the belt;
an elongate resilient body of each of the resilient bars;
a backing plate connected to and extending underneath each of the elongate resilient bodies;
a plurality of laterally extending support members for the impact bars which extend transversely across the support members with each support member mounted on a corresponding one of the cross members;
a pair of depending legs of each of the backing plates that project downwardly from either side thereof away from the resilient body thereabove so that the legs do not restrict compression of the resilient bodies thereabove as belt impacts are absorbed thereby; and
rigid mounting pads spaced along each of the support members to which the impact bars are secured via the backing plates thereof with the spaced mounting pads having gaps therebetween into which the depending legs of the backing plates fit for keeping space requirements under the belt for the backing plates including the depending legs thereof to a minimum.

20. The impact bed assembly of claim 19 wherein the backing plates each have a generally inverted U-shaped configuration having a downwardly facing opening between the legs thereof to avoid collection of debris therein.

21. The impact bed assembly of claim 19 wherein the support members each comprise a vertical plate portion having an upper edge surface, and the mounting pads of the support members are raised above the upper edge surface with the legs of the backing plates extending between the pads and toward the upper edge surface.

22. The impact bed assembly of claim 21, wherein the depending legs each include a lower edge having notches therein to guide the installation of the impact bars upon the pads of the support member.

23. The impact bed assembly of claim 19, wherein the mounting pads are elongated longitudinally for providing secure support to the elongated resilient bars secured thereto.

24. The impact bed assembly of claim 19, wherein the body of each of the resilient bars includes an elastomeric body, a plastic covering thereon, and a rigid insert in the elastomeric body.

25. The impact bed assembly of claim 19, wherein the backing plate includes an upwardly extending tab portion disposed along a downstream end of the elongate resilient body to resist migration thereof during belt travel.

26. A dynamic impact bed assembly for a conveyor belt, the dynamic impact bed comprising:
a plurality of resilient impact bars extending underneath and along the conveyor belt;
a dynamic frame assembly for the impact bars;
a plurality of cross members of the dynamic frame assembly extending below and across the belt;
a plurality of support members of the dynamic frame assembly for being rigidly connected to the cross members thereunder and supporting the impact bars thereon so as to extend between the overlying impact bars and the rigidly connected cross members thereunder to form the dynamic frame assembly for the impact bars;
a plurality of resilient mounting mechanisms between the dynamic mounting frame and conveyor frame structure that allow the dynamic frame assembly including the cross members and support members thereof to shift together downwardly upon application of impact forces to the impact bars; and
a detachable connection between each of the support members on the corresponding cross members so that disconnecting the detachable connection allows the support members to be shifted on the cross members therebelow for servicing the impact bars.

27. The dynamic impact bed assembly of claim 26, wherein the resilient mounting mechanisms are torsion bias units.

28. The dynamic impact bed assembly of claims 26 wherein the resilient mounting mechanisms and resilient elastomeric impact bars are configured to provide a travel distance of at least about 1½ inches to minimize damage to the conveyor belt upon application of impact forces to the impact bars.

29. A dynamic impact bed assembly for a conveyor belt, the dynamic impact bed comprising:

a plurality of resilient impact bars extending underneath and along the conveyor belt;
a dynamic frame assembly for the impact bars;
a plurality of cross members of the dynamic frame assembly extending below and across the belt;
a plurality of support members of the dynamic frame assembly rigidly connected to the cross members thereunder and supporting the impact bars thereon so as to extend between the overlying impact bars and the rigidly connected cross members thereunder to form the dynamic frame assembly for the impact bars; and
a plurality of resilient mounting mechanisms between the dynamic mounting frame and conveyor frame structure that allow the dynamic frame assembly including the cross members and support members thereof to shift together downwardly upon application of impact forces to the impact bars,
wherein the dynamic frame assembly includes a pair of mounting beams extending underneath and along the conveyor belt to which the ends of the cross members are mounted, and a pair of stabilization beams extending below and across the belt to be mounted to the ends of the mounting beams to increase stiffness of the dynamic frame assembly.

30. A dynamic impact bed assembly for a conveyor belt, the dynamic impact bed comprising:
a plurality of resilient impact bars extending underneath and along the conveyor belt;
a dynamic frame assembly for the impact bars;
a plurality of cross members of the dynamic frame assembly extending below and across the belt;
a plurality of support members of the dynamic frame assembly rigidly connected to the cross members thereunder and supporting the impact bars thereon so as to extend between the overlying impact bars and the rigidly connected cross members thereunder to form the dynamic frame assembly for the impact bars; and
a plurality of resilient mounting mechanisms between the dynamic mounting frame and conveyor frame structure that allow the dynamic frame assembly including the cross members and support members thereof to shift together downwardly upon application of impact forces to the impact bars,
wherein the resilient mounting mechanisms and resilient elastomeric impact bars are configured to provide a travel distance of at least about 1½ inches to minimize damage to the conveyor belt upon application of impact forces to the impact bars, and the resilient elastomeric impact bars are configured to provide about 0.625 inches of the 1½ inches of travel distance with the resilient mounting mechanisms configured to provide the remaining travel distance.

31. The dynamic impact bed assembly of claim 28, wherein the resilient elastomeric impact bars include a relatively thick resilient core and a thinner rigid plastic cover.

32. A dynamic impact bed assembly for a conveyor belt, the dynamic impact bed comprising:
a plurality of resilient impact bars extending underneath and along the conveyor belt;
a dynamic frame assembly for the impact bars;
a plurality of cross members of the dynamic frame assembly extending below and across the belt;
a plurality of support members of the dynamic frame assembly rigidly connected to the cross members thereunder and supporting the impact bars thereon so as to extend between the overlying impact bars and the rigidly connected cross members thereunder to form the dynamic frame assembly for the impact bars;
a plurality of resilient mounting mechanisms between the dynamic mounting frame and conveyor frame structure that allow the dynamic frame assembly including the cross members and support members thereof to shift together downwardly upon application of impact forces to the impact bars; and
side mounting beams to which ends of the cross members are secured, and the resilient mounting mechanisms comprise a predetermined number thereof that are mounted to the mounting beams and that is less than the number of cross member ends secured to the mounting beams.

33. A dynamic impact bed assembly for a conveyor belt, the dynamic impact bed comprising:
a plurality of resilient impact bars extending underneath and along the conveyor belt;
a dynamic frame assembly for the impact bars;
a plurality of cross members of the dynamic frame assembly extending below and across the belt;
a plurality of support members of the dynamic frame assembly rigidly connected to the cross members thereunder and supporting the impact bars thereon so as to extend between the overlying impact bars and the rigidly connected cross members thereunder to form the dynamic frame assembly for the impact bars; and
a plurality of resilient mounting mechanisms between the dynamic mounting frame and conveyor frame structure that allow the dynamic frame assembly including the cross members and support members thereof to shift together downwardly upon application of impact forces to the impact bars,
wherein the resilient mounting mechanisms are mounted to the dynamic frame assembly between the cross members.

34. A dynamic impact bed assembly for a conveyor belt that carries items in a belt travel direction on the belt, the dynamic impact bed assembly comprising:
a plurality of resilient impact bars extending underneath and along the conveyor belt in the belt travel direction;
a support member on which the impact bars are rigidly mounted with the support member extending across the belt and transversely under the impact bars in a transverse direction to the belt travel direction;
an outer resilient torsion mount located laterally beyond the support members and connected between the support member and frame structure for the conveyor belt to allow the support member and impact bars mounted thereon to resiliently shift downward with the belt impacted by items discharged onto the belt; and
an elongate body of elastomeric material of each of the resilient impact bars operable to absorb impact energy from the items discharged onto the belt.

35. The dynamic impact bed assembly of claim 34 wherein the impact bars each have a elongate, thin cover plate of plastic material attached to the elongate elastomeric body thereof with the elastomeric body being thicker than the thin, plastic cover plate thereon.

36. The dynamic impact bed assembly of claim 34 wherein the support member comprises multiple support members,
a dynamic frame assembly including the multiple support members, a pair of side members extending in the belt travel direction, and cross members extending across the conveyor belt connected at opposite ends thereof to the side members and having the supports members secured thereon; and the resilient torsion mount comprises resilient torsion mounts between the side members and the conveyor belt frame structure so that the entire dynamic frame assembly including the support members, the side members, and the cross members resiliently shifts downward with impact forces received by the impact bars.

37. The dynamic impact bed assembly of claim 36 wherein the side members each include an outboard mounting plate extending transversely thereto with the plates supporting the resilient torsion mounts out from under the conveyor belt.

38. The dynamic impact bed assembly of claim 34 including a cross member having the support member mounted thereon and extending below and across the belt with the cross member, the support member and the impact bars shifting downwardly together with impacts against the belt.

39. The dynamic impact bed assembly of claim 34 wherein the support member is part of an integrated bed frame assembly including longitudinal members extending in the belt travel direction and lateral members extending in the transverse direction with the resilient torsion mount comprising multiple resilient torsion mounts that support the integrated frame assembly for resiliently shifting with impacts against the belt.

40. A conveyor belt system comprising:
  a conveyor belt having an upper, carry run portion that travels in a downstream travel direction and a lower, return run portion below the upper run portion;
  conveyor frame structure for supporting the conveyor belt including side frame members extending out from under and along either side of the belt;
  a plurality of impact bars extending in the travel direction underneath the conveyor belt upper run portion;
  an integrated bed frame assembly including lateral members extending under the belt in a transverse direction to the travel direction for supporting the impact bars between the upper and lower run portions of the conveyor belt;
  opposite, longitudinal members of the integrated bed frame assembly extending in the belt travel direction adjacent the side frame members with the lateral members rigidly supported by the longitudinal members; and
  resilient mounts between the longitudinal members and the adjacent side frame members to allow the entire integrated bed frame assembly including the longitudinal members and the lateral members along with the impact bars supported thereby to generally shift together upon impacts against the upper run portion of the belt by items discharged thereon.

41. The conveyor belt system of claim 40 wherein the lateral members include cross members spaced from each other in the travel direction and interconnected by the opposite, longitudinal members, and support members that are mounted on the cross members and which support the impact bars thereon.

42. The conveyor belt system of claim 41 wherein the cross members and the support members have a slide interface therebetween, and inner and outer stops that define, respectively, an operative position with the impact bars under the belt and a service position with the impact bars out from under the belt.

43. The conveyor belt system of claim 40 wherein the longitudinal members have mounting plates extending out laterally therefrom above the adjacent side frame members with the resilient mounts secured therebetween.

44. The conveyor belt system of claim 43 wherein the resilient mounts comprise pairs of linked torsion bias units between each of the mounting plates and the adjacent side frame members.

45. The conveyor belt system of claim 41 wherein the cross members include reinforced end beams extending in the transverse direction and fixed to the longitudinal members at either end thereof to provide strength and rigidity to the integrated frame assembly.

46. The conveyor belt system of claim 41 wherein the cross members are connected to the longitudinal members at a height that is generally aligned with the resilient mounts to avoid taking up space with the resilient mounts above the cross members.

47. An impact bed assembly for a conveyor belt having a frame therefor, the impact bed assembly comprising:
  a plurality of resilient impact bars extending underneath and along a conveyor belt;
  support bed structure under the belt for supporting the impact bars thereon;
  torsion bias units disposed between the support bed structure and frame members of the conveyor belt frame to allow the support structure and resilient impact bars to shift due to impacts against the conveyor belt; and
  an elongate, elastomeric body of each of the impact bars so that both the impact bar elastomeric bodies and the torsion bias units act to absorb impact energy generated by impacts against the conveyor belt,
  wherein the torsion bias units are mounted outboard of the support bed structure out from under the conveyor belt.

48. The impact bed assembly of claim 47 wherein the support bed structure comprises an outer frame assembly having a generally square or rectangular configuration, cross members extending across the belt and rigidly connected to the outer frame assembly, and support members on the cross members and having the impact bars rigidly supported thereon and extending thereacross.

49. The impact bed assembly of claim 47 wherein the torsion bias units are generally level with the support bed structure to avoid taking up extra space under the belt and over the support bed structure with the torsion bias units.

50. An impact bed assembly for a conveyor belt having a frame therefor, the impact bed assembly comprising:
  a plurality of resilient impact bars extending underneath and along a conveyor belt;
  support bed structure under the belt for supporting the impact bars thereon;
  torsion bias units disposed between the support bed structure and frame members of the conveyor belt frame to allow the support structure and resilient impact bars to shift due to impacts against the conveyor belt; and
  an elongate, elastomeric body of each of the impact bars so that both the impact bar elastomeric bodies and the torsion bias units act to absorb impact energy generated by impacts against the conveyor belt,
  wherein the torsion bias units are paired with one of each of the pairs of torsion bias units fixed to the support bed structure and the other of each of the pairs of torsion bias units fixed to a conveyor belt frame member, and
  a link extending between the pair of torsion bias units to increase vertical travel of the support bed structure for maximizing impact energy absorbed thereby.

* * * * *